US012363469B2

(12) United States Patent
Kim

(10) Patent No.: US 12,363,469 B2
(45) Date of Patent: Jul. 15, 2025

(54) HEADPHONES AND WEARABLE DEVICE

(71) Applicant: SAMSUNG ELECTRONICS CO., LTD., Suwon-si (KR)

(72) Inventor: Jinwook Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 334 days.

(21) Appl. No.: 18/114,473

(22) Filed: Feb. 27, 2023

(65) Prior Publication Data

US 2023/0224616 A1 Jul. 13, 2023

Related U.S. Application Data

(63) Continuation of application No. PCT/KR2022/018373, filed on Nov. 21, 2022.

(30) Foreign Application Priority Data

Dec. 16, 2021 (KR) ........................ 10-2021-0180816
May 4, 2022 (KR) ........................ 10-2022-0055374

(51) Int. Cl.
*H04R 25/00* (2006.01)
*H04R 1/10* (2006.01)
*H04R 5/033* (2006.01)

(52) U.S. Cl.
CPC ......... *H04R 1/1008* (2013.01); *H04R 5/0335* (2013.01)

(58) Field of Classification Search
CPC .. H04R 1/1008; H04R 1/1066; H04R 1/1083; H04R 5/0335

(Continued)

(56) References Cited

U.S. PATENT DOCUMENTS 9,301,039 B2 3/2016 Brunner et al.
9,900,682 B2 2/2018 Breen et al.
(Continued)

FOREIGN PATENT DOCUMENTS

CN 110944257 3/2020
EP 2475187 A2 * 7/2012 ........... H04R 1/1066
(Continued)

OTHER PUBLICATIONS

International Search Report dated Feb. 28, 2023 for PCT/KR2022/018373.

*Primary Examiner* — Phylesha Dabney
(74) *Attorney, Agent, or Firm* — Nixon & Vanderhye P.C.

(57) ABSTRACT

Headphones may include a headband, a first earpiece connected to an end of the headband, and a second earpiece connected to the other end of the headband, wherein the first earpiece may include a first plate connected to an end of the headband, a first housing arranged on a surface of the first plate, a first ear pad contacting the first housing and aligned in a first direction in which the first plate and the first housing are arranged, and a first pressure unit between at least the first ear pad and the first housing, the first pressure unit may include a first pressure plate, and a first pressure pin between the first pressure plate and the first housing, a portion of the first pressure pin may be unconstrainedly accommodated in an inside of the first pressure plate, and the first pressure plate may be tiltable relative to the first housing.

20 Claims, 14 Drawing Sheets

(58) Field of Classification Search
USPC .......................................................... 381/347
See application file for complete search history.

(56) References Cited

U.S. PATENT DOCUMENTS

| | | | |
|---|---|---|---|
| 10,764,672 | B2 | 9/2020 | Clark et al. |
| 2011/0170731 | A1 | 7/2011 | Beckhart |
| 2019/0246197 | A1 | 8/2019 | Breen et al. |
| 2020/0045158 | A1 | 2/2020 | Guzman et al. |

FOREIGN PATENT DOCUMENTS

| | | | |
|---|---|---|---|
| JP | 07-327291 | | 12/1995 |
| JP | 2001-197582 | A | 7/2001 |
| JP | 2008-193609 | A | 8/2008 |
| JP | 2008-283281 | A | 11/2008 |
| JP | 2012-147139 | A | 8/2012 |

* cited by examiner

HEADPHONES AND WEARABLE DEVICE

CROSS-REFERENCE TO RELATED APPLICATIONS

This application is a Bypass continuation application of International Application No. PCT/KR2022/018373 designating the United States, filed on Nov. 21, 2022, in the Korean Intellectual Property Receiving Office and claiming priority to Korean Patent Application No. 10-2021-0180816, filed on Dec. 16, 2021, in the Korean Intellectual Property Office and to Korean Patent Application No. 10-2022-0055374, filed on May 4, 2022, in the Korean Intellectual Property Office, the disclosures of which are all hereby incorporated by reference herein in their entireties.

BACKGROUND

1. Field

Certain example embodiments relate to headphones and/or a wearable device.

2. Description of Related Art

Five sensory organs of a human are concentrated in the head, and thus, a device for providing an audiovisual experience is typically worn on the human head. The device for providing an audiovisual experience includes a head mounted display, for example, earphones, headphones, headsets, and virtual reality (VR) headsets. In addition, some wearable devices are worn on the head.

Among devices wearable on the head, for example, when wearing headsets, pressure may be applied to the head. Specifically, when wearing stereo headsets, an ear cup may mechanically surround the ears of the user to shield external sound. The headsets may apply strong pressure to the human head compared to earphones (e.g., earbuds).

For the devices mentioned above, a wearing point may need to be adjusted to wear the device on the head with various shapes for each person and a mounted position may need to be maintained to provide audiovisual experience to the user after the device is worn on the head.

To achieve the former, typically, a device adopts a hinge structure in a predetermined point to adjust the device based on the head shape and size of the user and to achieve the latter, typically, a device is worn by pressing a portion of the head of the user with elasticity.

SUMMARY

According to an example embodiment, headphones with a slim external figure may be provided.

According to an example embodiment, headphones that have a small volume and which are easy to carry may be provided.

According to an example embodiment, headphones that evenly distribute pressure to a wearing point by distributing pressure points when worn on the head may be provided.

According to an example embodiment, headphones that may closely contact various three-dimensional face shapes may be provided.

According to an example embodiment, headphones that may adjust adhesion for preventing or reducing sound loss based on various three-dimensional face shapes may be provided.

According to an example embodiment, headphones with less physical fatigue when worn for a long time may be provided.

According to various example embodiments, headphones may include a headband, a first earpiece connected, directly or indirectly, to an end portion of the headband, and a second earpiece connected, directly or indirectly, to another end portion of the headband opposite said end portion, wherein the first earpiece may include a first plate connected, directly or indirectly, to an end of the headband, a first housing arranged on, directly or indirectly, a surface of the first plate, a first ear pad contacting the first housing and aligned in a first direction in which the first plate and the first housing are arranged, and a first pressure unit between at least the first ear pad and the first housing, wherein the first pressure unit includes a first pressure plate and a first pressure pin between at least the first pressure plate and the first housing, wherein a portion of the first pressure pin is unconstrainedly accommodated in an inside of the first pressure plate, wherein the first pressure plate is tiltable relative to the first housing.

According to various example embodiments, a wearable device may include a band, and a contact piece connected, directly or indirectly, to an end and the other end of the band, wherein the contact piece may include a housing connected, directly or indirectly, to the band, a contact pad on, directly or indirectly, a side of the housing, and a pressure unit between the housing and the contact pad, wherein the pressure unit may include a pressure plate connected, directly or indirectly, to the housing, and a pressure pin between at least the pressure plate and the housing, wherein a portion of the pressure pin is unconstrainedly accommodated in an inside of the pressure plate.

According to various example embodiments, headphones may include a headband, a first earpiece connected to an end of the headband, and a second earpiece connected to the other end of the headband, wherein the first earpiece may include a first plate connected to an end of the headband, a first housing arranged on a surface of the first plate, a first ear pad contacting the first housing and aligned in a first direction in which the first plate and the first housing are arranged, and a first pressure unit between the first ear pad and the first housing, wherein the second earpiece includes a second plate connected to an end of the headband, a second housing arranged on a surface of the second plate, a second ear pad contacting the second housing and aligned in a second direction in which the second plate and the second housing are arranged, and a second pressure unit between the second ear pad and the second housing, wherein the first housing includes a plurality of first housing grooves along a circumference of the first housing, wherein the second housing includes a plurality of second housing grooves along a circumference of the second housing, wherein the first pressure unit includes a first pressure plate arranged to contact the first ear pad along a circumference of the first ear pad, and a plurality of first pressure pins of which ends are unconstrainedly connected to the first pressure plate and the other ends are unconstrainedly connected to the first housing grooves, respectively, wherein the second pressure unit includes a second pressure plate arranged to contact the second ear pad along a circumference of the second ear pad, and a plurality of second pressure pins of which ends are unconstrainedly connected to the second pressure plate and the other ends are unconstrainedly connected to the second housing grooves, respectively, wherein the first pressure pins are unconstrainedly connected to the first pressure plate as the ends of the first pressure pins are accommodated in a plurality of first pressure plate grooves, respectively, provided along a circumference of the first pressure plate, the second pressure pins are unconstrainedly connected to the second pressure plate as the ends of the second pressure pins are accommodated in a plurality of second pressure plate grooves, respectively, provided along a circumference of the second pressure plate, at least a portion of each of the first housing grooves includes a straight line part provided in a direction perpendicular to a surface where the first pressure plate contacts the first ear pad, at least a portion of each of the second housing grooves includes a straight line part provided in a direction perpendicular to a surface where the second pressure plate contacts the second ear pad, a first repulsive body is accommodated in the straight line part of the first housing grooves, and a second repulsive body is accommodated in the straight line part of the second housing grooves.

According to an example embodiment, headphones may have a slim external figure.

According to an example embodiment, headphones may be easily carried because the volume is small.

According to an example embodiment, headphones may evenly distribute pressure to a wearing point by distributing pressure points when worn on the head of the user.

According to an example embodiment, headphones may closely contact various three-dimensional face shapes.

According to an example embodiment, adhesion for preventing or reducing sound loss may be adjusted or controlled based on various three-dimensional face shapes.

According to an example embodiment, a user may feel less fatigued even when wearing headphones for a long time.

Each embodiment herein may be used in combination with any other embodiment(s) described herein.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
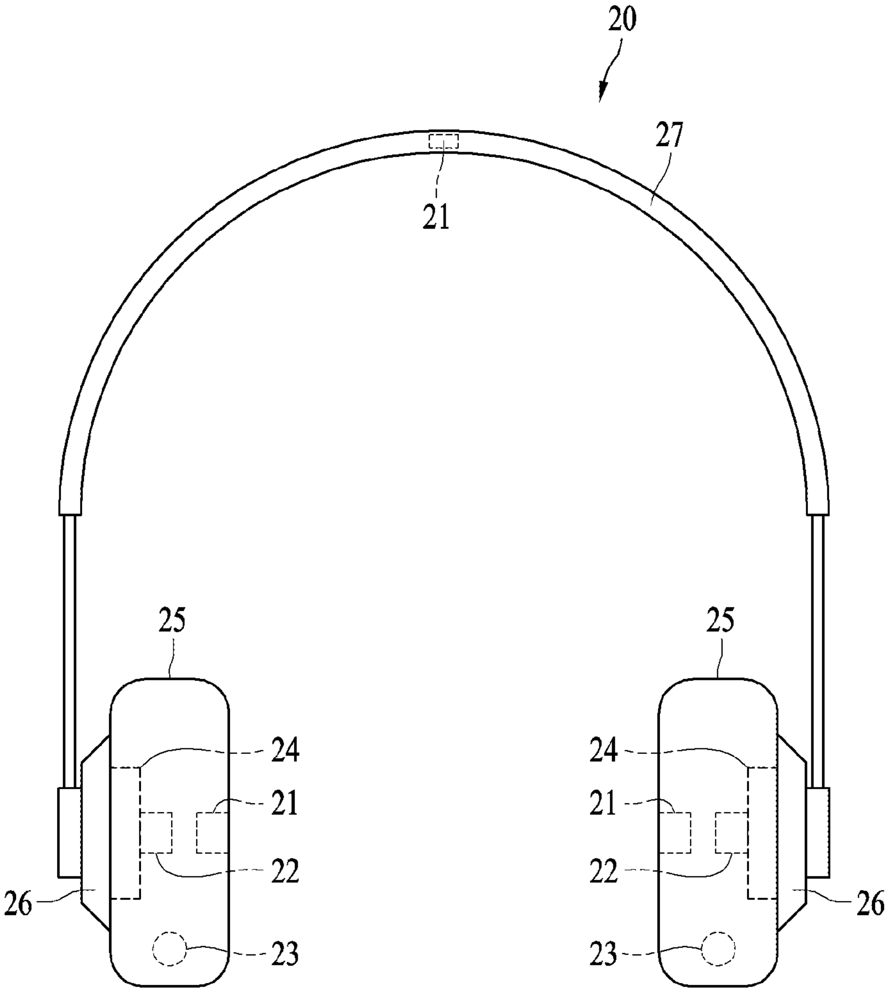
FIG. 1 is a front view illustrating headphones according to an example embodiment.

Hereinafter, example embodiments will be described in detail with reference to the accompanying drawings. However, various alterations and modifications may be made to the example embodiments. Here, the example embodiments are not construed as limited to the disclosure. The example embodiments should be understood to include all changes, equivalents, and replacements within the idea and the technical scope of the disclosure.

The terminology used herein is for the purpose of describing particular example embodiments only and is not to be limiting of the example embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or accessories, but do not preclude the presence or addition of one or more other features, integers, steps, operations, elements, accessories and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation.

Also, in the description of the components, terms such as first, second, A, B, (a), (b) or the like may be used herein when describing components. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element(s) can also be "connected", "coupled", or "attached" to the constituent elements.

The same name may be used to describe an element included in the example embodiments described above and an element having a common function. Unless otherwise mentioned, the descriptions on the example embodiments may be applicable to the following example embodiments and thus, duplicated descriptions will be omitted for conciseness.

Certain example embodiments relate to headphones and a wearable device. For example, embodiments hereinafter relate to headphones including a pressure distribution structure or a wearable device including a pressure distribution structure.

By providing the pressure distribution structure in the headphones and the wearable device, the aforementioned devices may evenly distribute pressure applied to a wearing point when the devices are worn on the head of a user.

For example, in case of headphones, the pressure distribution structure may be provided in an earpiece to evenly distribute pressure applied around the ears by the headphones worn around the ears.

In addition, in a wearable device, such as a head mounted display, the pressure distribution structure may be provided in a display housing to evenly distribute pressure applied around the eyes as the head mounted display is mounted on a front part of the face.

Since the pressure distribution structure described above is applicable to a wearable device, such as headphones, headsets, and a head mounted display, for brevity, the description is provided based on an example of headphones including the pressure distribution structure according to an example embodiment. Accordingly, the description on the headphones and related drawings are to describe headphones to which the pressure distribution structure is applied as an example and are not intended to limit the scope to headphones.

Meanwhile, for a potential effect provided by including the pressure distribution structure, the description has described that the pressure may be evenly distributed to the wearing point of the headphones according to an example embodiment. However, the effect of the headphones according to an example embodiment is not limited thereto.

FIG. 1 illustrates headphones according to an example embodiment.

According to an example embodiment, headphones 20 may be a stereo headset device configured to prevent or reduce ambient sound (e.g., external noise) from being delivered to an eardrum of a user, and play sound provided by another electronic device through a speaker 24. The headphones 20 may include a wear detecting sensor 21, an inertia sensor 22, a sound sensor 23, the speaker 24, an earpiece 25, a touch sensor 26, and a housing (e.g., a headband 27). However, a shape of the headphones 20 illustrated in FIG. 1 is an example, and the shape is not limited thereto.

The wear detecting sensor 21 may sense whether the headphones 20 are worn on a head and/or an ear of a user, and may sense a posture in which the headphones 20 is worn on a body part (e.g., head or neck) of a user. For example, the headphones 20 may be worn on an ear or a neck of a user. A processor of the headphones 20 may determine a body part on which the headphones 20 is worn, based on data obtained by sensing by the wear detecting sensor 21. In addition, the headphones 20 may determine whether the earpiece 25 is in a normal posture or a rotated posture in a backward direction with respect to the housing (e.g., the headband 27), based on the data obtained by sensing by the wear detecting sensor 21. A plurality of wear detecting sensors 21 may be provided, and each of the wear detecting sensors may run independently. For example, a head proximity detecting sensor, which is one of the plurality of wear detecting sensors and placed on a head side, may include at least one of a capacitive sensor and a resistive sensor, and an ear proximity detecting sensor placed on an ear side may include an optical sensor. Data obtained by sensing by the head proximity detecting sensor may be used for determining a wearing state (e.g., a normal posture or a rotated posture in which an earpiece is rotated in a backward direction). The ear proximity detecting sensor may include a first ear proximity detecting sensor placed on an ear, and a second sear proximity detecting sensor placed on the other ear. Data obtained by sensing by the ear proximity detecting sensor may be used for determining whether the earpiece is worn on an ear.

In the stereo headset device, an inner surface of the earpiece 25 may typically face toward an inside (e.g., a space between the earpieces 25), however, the inner surface of the earpiece 25 may be reversed to face toward an outside (e.g., an outer space, which is not the space between the earpieces 25) by a mechanical joint structure between the earpiece 25 and the housing. Since sound of the speaker 24 may be output in a direction to which the inner surface of the earpiece 25 faces, in case the earpiece 25 is reversed, a direction of outputting the sound may be reversed. In case one earpiece 25 of the pair of earpieces 25 is reversed, the headphones 20 may determine proximity between the earpiece 25 and a body part of a user. Accordingly, the headphones 20 may determine various wearing states such as a normal wearing, wearing on one side, wearing the headband 27 down to a neck, and wearing the stereo headset device on the neck, based on various types of the stereo headset device.

The wear detecting sensor 21, for example, may include at least one of a proximity sensor and a grip sensor.

The proximity sensor may be a sensor identifying proximity The headphones 20 may determine the above-described wearing state, based on data obtained by sensing by the proximity sensor. The proximity sensor may be, for example, an optical proximity sensor using an infrared ray light-emitting diode (IR LED) and a photodiode. In the optical proximity sensor, a light receiver (e.g., the photodiode) may receive an optical signal emitted from a light emitter (e.g., the IR LED). The headphones 20 may determine proximity based on a distance calculated based on an intensity of received light or a time difference between light emission and light reception. However, the example is not limited thereto, and the proximity sensor may be implemented by an ultrasonic sensor configured to transmit and receive an ultrasonic wave. In the ultrasonic sensor, a transmitter may transmit an ultrasonic signal and a receiver may receive an ultrasonic signal. The electronic device may determine the proximity based on a distance calculated based on an intensity of a received ultrasonic signal or a time difference between transmission and reception of the ultrasonic wave.

The above-described proximity sensor may be placed on an outside and/or an inside of the earpiece 25. The processor may obtain data (e.g., the above-described signal reception intensity, the signal reception time, and the distance) related to proximity between the earpiece 25 and a body part (e.g., an ear) of the user, by sensing by the proximity sensor. A plurality of proximity sensors may be placed on one earpiece 25. In addition, a proximity sensor may be mounted on each of the pair of earpieces 25 (e.g., the earpiece 25 corresponding to a left ear and the earpiece 250 corresponding to a right ear).

The proximity sensor may be mounted on the headband 27. Through sensing by the proximity sensor mounted on the headband 27, the processor may obtain data related to whether the headphones 20 is worn on the ear of the user. For example, although the earpiece 25 is worn on the ear of the user, the headband 27 may not be worn on a top of the head of the user. The headphones 20 may include an additional proximity sensor for determining the above-described various wearing states.

The grip sensor may sense touch or contact in a capacitance method. The grip sensor may be arranged on the earpiece 25 and/or the headband. The headphones 20 including both the proximity sensor and the grip sensor may prevent or reduce an error related to determination on attach or detach when the user wears the headphones 20. In other words, accuracy of determining a wearing state may be improved by combinedly using data obtained by sensing by the proximity sensor and the grip sensor. The grip sensor may be, similar to the above-described proximity sensor, mounted on each of the pair of earpieces 25. In addition, since the grip sensor and the touch sensor 26 have same sensing and processing mechanism, the grip sensor and the touch sensor 26 may share and use one processing module. However, the example is not limited thereto, and the processing module (e.g., comprising a processor and/or sensor) configured to process data of the grip sensor and the touch sensor 26 may be divided into separate modules.

The inertia sensor 22 may be a sensor configured to sense inertia (e.g., force), and may sense an amount of pose change occurred by movement of the user. The processor, comprising processing circuitry, may generate inertia information (e.g., acceleration data indicating an acceleration and angular velocity data indicating an angular velocity) by sensing inertia by the inertia sensor 22. For example, the inertia sensor 22 may include the acceleration sensor, a gyro sensor, or a combination of the acceleration sensor and the gyro sensor. The acceleration sensor may sense an acceleration with respect to three axes, and the gyro sensor may sense an angular velocity based on three axes. The inertia sensor 22 may be referred to as an six-axis sensor. Alternatively, an integrated sensor integrating the acceleration sensor and the gyro sensor may output an integrated value integrating an output value of the acceleration sensor and an output value of the gyro sensor, and may be referred to as a software (SW) sensor (e.g., a game rotation vector sensor). The inertia sensor 22 may be provided as a pair (e.g., two pieces) and may be accommodated in each of the pair of earpieces, and the pair of inertia sensors may be connected, directly or indirectly, to a single processor and may support fast head tracking with low power consumption without time latency.

The sound sensor 23 may sense a sound signal. For example, the sound sensor 23 may sense and collect ambient sound and voice of the user, and may be implemented as a microphone. The sound sensor 23 may sense a sound signal caused by uttering of the user. The sound sensor 23 may include a plurality of microphones. Based on a beam-forming technique, the headphones 20 may recognize voice uttered from a mouth of the user with a higher recognition rate, based on a comparison between a sound signal obtained by sensing from a microphone placed close to the mouth of the user and a sound signal obtained by sensing from a microphone placed far from the mouth of the user.

In addition, the sound sensors 23 arranged on various portions of the headphones 20 may sense various external sounds. For example, each of the sound sensors 23 mounted on the first earpiece 25 (e.g., the earpiece 25 equipped on a left ear), the second earpiece 25 (e.g., the earpiece 25 equipped on the right ear), and the headband 27 of the headphones 20 may generate a sound signal by sensing sound in individual volume depending on a location of a sound source based on the headphones 20. The headphones 20 may estimate a direction of the sound source based on the sound signal generated by sensing by the sound sensor 23 mounted to each portion of the headphones 20. For example, in case sound signals having a same waveform are sensed by sound sensors 23 arranged on left and right earpieces 25, a volume of the sound signal sensed by the sound sensor 23 arranged on the left side may be greater. The headphones 20 may determine that the sound source causing the sound is placed on a left side of the headphones 20.

In addition, the headphones 20 may utilize the sound sensor 23 and the inertia sensor 22 as a voice pick-up (VPU) sensor for determining whether a user (hereinafter, a "wearer") wearing the headphones 20 utters. For example, the inertia sensor 22 may sense subtle vibration occurred by utterance. The headphones 20 may determine whether the wearer utters by connecting inertia data obtained by sensing the subtle vibration occurred by utterance by the inertia sensor 22 with a sound signal obtained by sensing by the sound sensor 23 (e.g., the microphone). The headphones 20 may identify whether the sensed sound is a sound generated by the user or an external sound, by detecting utterance. In other words, the headphones 20 may accurately determine context of the sound source.

The speaker 24 may be a module configured to output sound. In case the headphones 20 worn on the ear of the user receives sound data from another external device, the speaker 24 may output sound corresponding to the received sound data. Outputting the sound may be referred to as playing. The speaker 24 may include various components such as a tweeter and/or a woofer.

Figure 2:
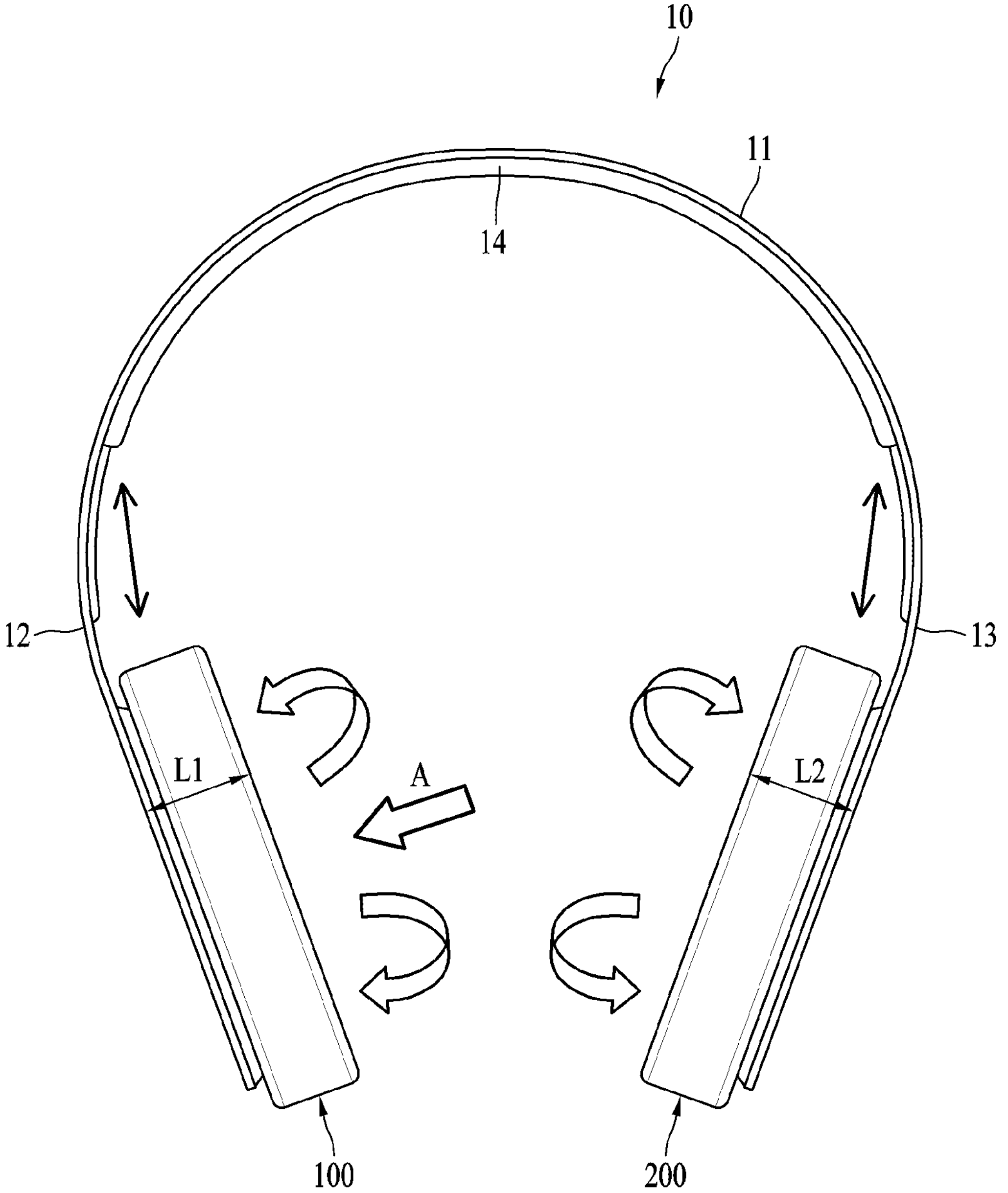
FIG. 2 is a front view illustrating headphones according to an example embodiment.

The touch sensor 26 may sense a gesture such as a swiping action and touching by a finger of the user. In response to touch data obtained by sensing by the touch sensor 26, the headphones 20 may perform control including at least one or a combination of two or more of playing music, stop, playing next music, and playing previous music. FIG. 2 illustrates that the touch sensor 26 is arranged on an outer surface (e.g., a surface facing an outer space, not a space between earpieces) of the earpiece 25, however, the example is not limited thereto.

The communication module, comprising communication circuitry, may be a module configured to communicate with an outside wirelessly. The communication module may establish communication with another device and/or an access point (AP) via at least one of a Bluetooth (BT) network, a wireless fidelity (Wi-Fi) network, an ANT+ network, a long-term evolution (LTE) network, a 5th generation (5G) network, and a narrowband Internet of Things (NB-IoT) network, or a combination of two or more thereof. For reference, the pair of earpieces 25 of the headphones 20 is connected by a wire in the housing, however, the example is not limited thereto. A device (e.g., the processor, the speaker 24, the inertia sensor 22, the sound sensor 23, and the wear detecting sensor 21) included in one earpiece 25 of the pair of the earpieces 25 may be wirelessly connected to a device included the other earpiece 25 via the communication module. The device included in the earpiece 25 may wirelessly transmit and/or receive data and/or a signal from the device included in the other earpiece 25, such as via the communication module. Each "module" herein may comprise circuitry.

The earpiece 25 may be a piece covering one ear of the user when the headphones 20 is worn, and may be provided as a pair. The earpiece 25 may accommodate at least one or a combination of two or more of the wear detecting sensor 21, the inertia sensor 22, the sound sensor 23, the speaker 24, the touch sensor 26, the processor (comprising processing circuitry), and the communication module. Components included in the headphones 20 may be distributed and accommodated in each of the pair of earpieces 25. The pair of earpieces 25 may be connected, directly or indirectly, to each other through the housing (e.g., the headband 27). In case the headphones 20 is worn on an ear of the user, the pair of earpieces 25 may seal the ear of the user from ambient sound. For example, the earpiece 25 may include an earpad for sealing the ear of the user from the ambient sound.

In addition, a physical control interface may be provided in the earpiece 25 (e.g., an outer surface of the earpiece 25) and/or the headband 27. The physical control interface may be a physical user interface (PUI) including a button and/or a switch. The physical control interface may receive a user input for turning on power or performing a predetermined function.

Figure 12A:
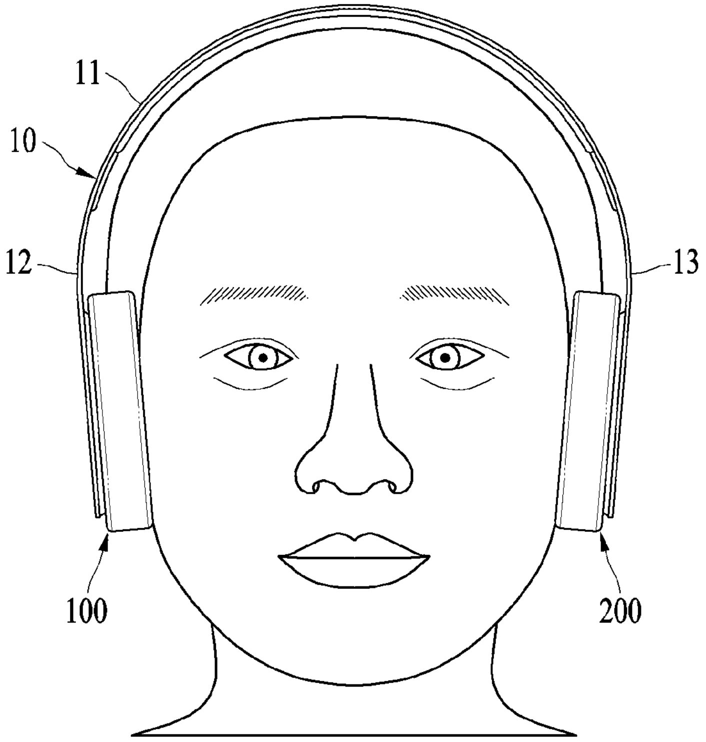
FIG. 12A is a view illustrating a state of use of the headphones according to an example embodiment.

FIG. 2 is a front view illustrating headphones 10 (e.g., the headphones 20 of FIG. 1) according to an example embodiment. The headphones 10 may include a first earpiece 100 (e.g., the earpiece 25 of FIG. 1) mountable around the right ear of a user and a second earpiece 200 (e.g., the earpiece 25 of FIG. 1) mountable around the left ear of the user. FIG. 12A illustrates that the first earpiece 100 is mounted around the right ear of the user and the second earpiece 200 is mounted around the left ear of the user. In addition, the headphones 10 may include a headband 11 (e.g., the headband 27 of FIG. 1) configured to connect the first earpiece 100 to the second earpiece 200 and support the first earpiece 100 and the second earpiece 200 on the headphones 10.

In addition, the first earpiece 100 may be mounted on the periphery of the left ear of the user and the second earpiece 200 may be mounted on the periphery of the right ear. In an acoustic device, such as the headphones 10, the left-right division is to distinguish a position for providing a stereophonic sound method that has a difference in sound provided from the left and the right, such as stereo sound. Since the headphones 10 according to an example embodiment are not related to the sound method and relate to a physical structure of the headphones 10, the description that the first earpiece 100 may be mounted around the right ear or the left ear of the user is for ease of description and is not intended to limit the position where the first earpiece 100 is mounted.

For example, the overall shape of the first earpiece 100 and the second earpiece 200 may be a circular plate or an oval plate. The user may feel uncomfortable and stuffy by wearing the first earpiece 100 and the second earpiece 200 for a long time since the first earpiece 100 and the second earpiece 200 may directly contact the body of the user. The first earpiece 100 and the second earpiece 200 of the headphones 10 according to an example embodiment may have a circular plate shape or an oval plate shape with a closed-curved outline that may surround typical ears of a user to minimize or reduce the body area contacted when worn.

However, the shapes of the first earpiece 100 and the second earpiece 200 are not limited to the curved shape described above and may be a shape with an outline combined with straight lines or an angular shape for design.

In addition, the sizes of the first earpiece 100 and the second earpiece 200 may vary. For example, the headphones 10 may be classified into an on-ear type and an over-ear type based on the size of the earpiece.

The on-ear type may be a type that an earpiece is placed on the ear to contact the ear rather than seal around the ear of the user, and the over-ear type is a type for sound insulation by shielding an inner space from the outside as an earpiece completely covers the ear to prevent or reduce the sound provided by the earpiece from leaking to the outside and prevent or reduce ambient sound from entering a space between the earpiece and the ear of the user.

Accordingly, when the headphones 10 are implemented as an on-ear product, the size of the headphones 10 may be a minimum or small size to cover the ears of a general user and when the headphones 10 are implemented as an over-ear product, the size of the headphones 10 may be a size to cover the ears and periphery.

In addition, the headphones 10 according to an example embodiment may be preferably implemented in the over-ear type. The over-ear type may need to be strongly adhered to the periphery of the ears of the user for sound insulation, and in this case, strong pressure may be applied to the periphery of the ears.

For example, the headphones 10 according to an example embodiment may evenly distribute pressure applied to the periphery of the ears of the user over an area where the first earpiece 100 contacts the periphery of the right ear and an area where the second earpiece 200 contacts the periphery of the left ear, and thus, although the total force is unchanged, the user may feel less fatigued.

In an example embodiment, a thickness L1 of the first earpiece 100 and a thickness L2 of the second earpiece 200 of the headphones 10 may vary.

For example, since the first earpiece 100 and the second earpiece 200 of the headphones 10 according to an example embodiment do not include a hinge structure for inclination of the earpiece, a space to accommodate the hinge structure may not be needed, and thus, the first earpiece 100 and the second earpiece 200 may be formed to be thin and slim as the space is not provided. This may allow the headphones 10 to have a beautiful exterior in design and may improve portability since a space for carrying the headphones 10 decreases due to the reduced thickness.

On the other hand, since the headphones 10 according to an example embodiment may be a mass-produced industrial product and one design may need to be used by people with different head shapes, an inclinable system for the first earpiece 100 and the second earpiece 200, such as a hinge, may be needed. As described above, in the headphones 10 according to an example embodiment, a structure, such as a hinge, is excluded for a slim design and portability and instead, as the pressure distribution structure described above is provided to the first earpiece 100 and the second earpiece 200, the first earpiece 100 and the second earpiece 200 may tilt based on various body types of a user. This will be described further below.

In an example embodiment, at least a portion of the headband 11 of the headphones 10 may be formed in an arc shape. In addition, the portion of the headband 11 may be formed in a straight line.

In addition, the headband 11 may have a symmetrical shape. When the user grips the headband 11 to grip the headphones 10 by the hand, in the case where the headband 11 has a symmetrical shape, the headphones 10 may have an overall symmetrical shape, and thus, the user may grip the headphones 10 without needing to apply unnecessary torque to the headphones 10.

In addition, when the headband 11 has a symmetrical shape, the user may store the headphones 10 by hanging the headband 11 on a part protruding toward one side from a location, such as a wall.

The first earpiece 100 may be connected, directly or indirectly, to one end of the headband 11, and the second earpiece 200 may be connected, directly or indirectly, to the other end of the headband 11, and thus, the headband 11 may support the first earpiece 100 and the second earpiece 200.

Referring to FIG. 12A, the headband 11 may be on the top of the user's head when wearing the headphones 10. For example, a head pad 14 may be provided on one side of the headband 11 such that the headband 11 may be softly mounted on the head of the user.

Unlike FIG. 2, when a radius of the arc portion of the headband 11 is designed to be sufficiently large to prevent or reduce the headband 11 from contacting various head shapes, the head pad 14 may not be provided.

Referring back to FIG. 2, although not illustrated, a hinge structure may be provided in the headband 11 and may be folded. For example, the hinge structure may be formed in the center of the headband 11 and a plurality of hinge structures may be provided at various points.

When the foldable hinge structure described above is provided, the user may carry the headphones 10 by folding the headphones 10 and storing the headphones 10 in a carrying structure, such as a bag.

In addition, at least a portion of the headband 11 may be formed of an elastic member (e.g., flexible metal and elastic plastic). Considering a face shape of a person on which inclination of the headband 11 of the first earpiece 100 and the second earpiece 200 is not enough to appropriately wear the headphones 10, the headband 11 may have elasticity and the headband 11 may stretch left and right when wearing the headphones 10.

An elastic force of the headband 11 in a left and right open state may assist the first earpiece 100 and the second earpiece 200 to be closely adhered to the body of the user. The adhesion may assist to prevent or reduce sound loss of the headphones 10.

A first stem 12, which is long, may be provided in a connecting part where the first earpiece 100 is connected, directly or indirectly, to an end of the headband 11, and a second stem 13, which is long, may be provided in a connecting part where the second earpiece 200 is connected, directly or indirectly, to the other end of the headband 11.

In addition, the first stem 12 may be integrally formed with a first plate (e.g., a first plate 110 of FIG. 3) of the first earpiece 100 or may be integrally formed with the headband 11. The first stem 12 refers to a portion where the first earpiece 100 is connected, directly or indirectly, to the headband 11, and this is not intended to distinguish the first stem 12 from the first earpiece 100 or the headband 11.

On the other hand, since the hinge structure between the headband 11 and the earpiece to tilt the earpiece is not needed to be provided in the headphones 10, the first stem 12 that is the connecting part for connecting the first earpiece 100 to the headband 11 may be integrally formed with the first earpiece 100 and/or the headband 11.

For example, when the first stem 12 is integrally formed with the first earpiece 100 and/or the headband 11, a design may be excellent because a parting line is not formed between the first stem 12 and the first earpiece 100 and/or the headband 11 and foreign material, such as dust, may not be stuck.

In an example embodiment, the headphones 10 may include a length adjuster (not shown) to be worn on various body types. The length adjuster (not shown) may be provided in the first stem 12, and/or the second stem, and/or an arbitrary portion of the headband 11. For example, when the length adjuster (not shown) is provided to the first stem 12 and the second stem 13, the length of the head band 11 may be adjusted around the first stem 12 and the second stem 13 in the arrow direction illustrated around the first stem 12 and the second stem 13 in FIG. 2.

For example, the headphones 10 according to an example embodiment may accommodate, in the inner side of an open curve formed by the headband 11, the first earpiece 100, and the second earpiece 200, the head with various distances from the ears to the crown of the head depending on the height direction of the user.

The structure of the first earpiece 100 of the headphones 10 may be physically the same as the structure of the second earpiece 200 of the headphones 10. Hereinafter, the description is provided based on the first earpiece 100 for brevity, and the description may be equally applied to the second earpiece 200.

Figure 3:
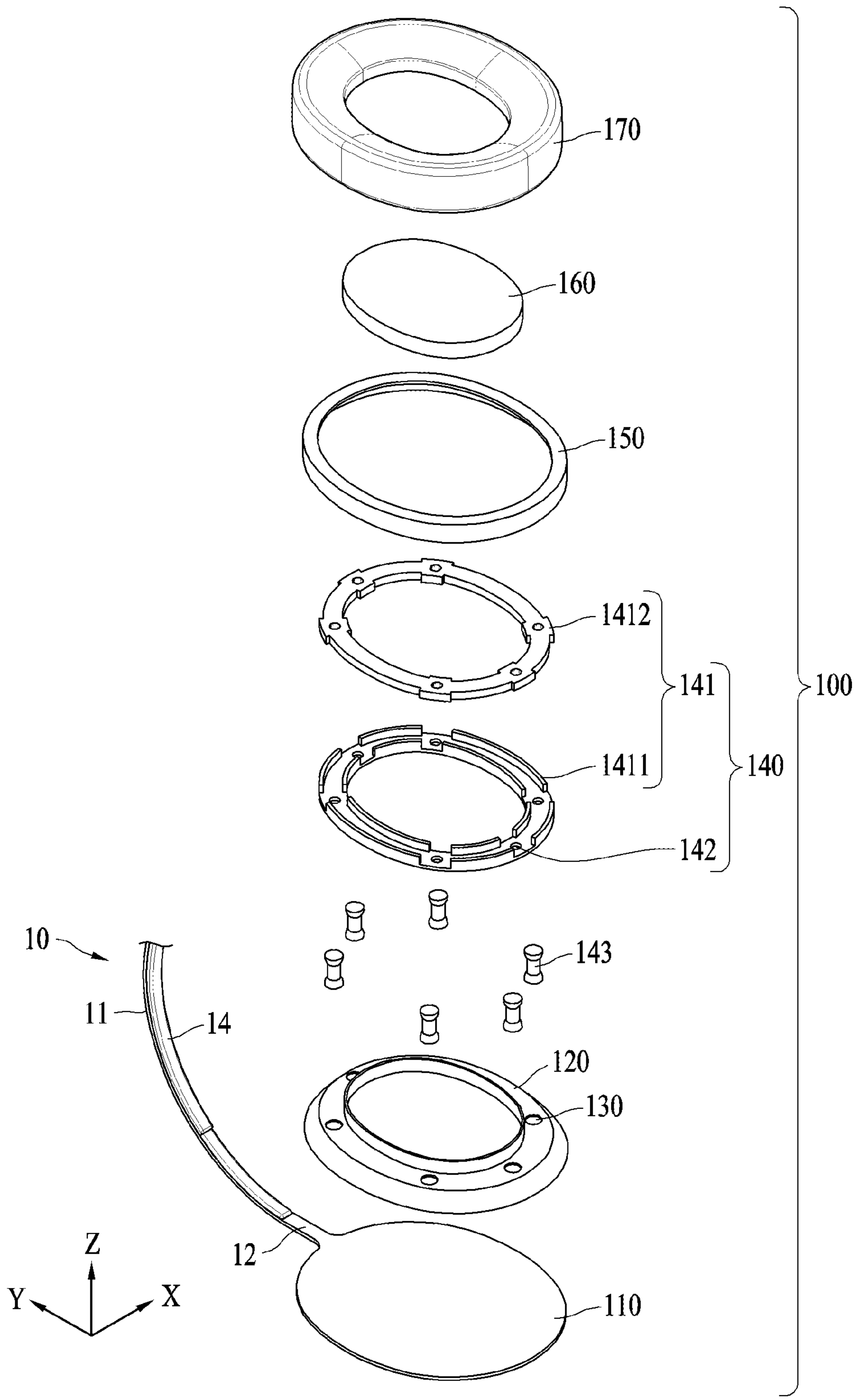
FIG. 3 is a view illustrating an exploded state of a first earpiece of headphones according to an example embodiment.
Figure 4A:
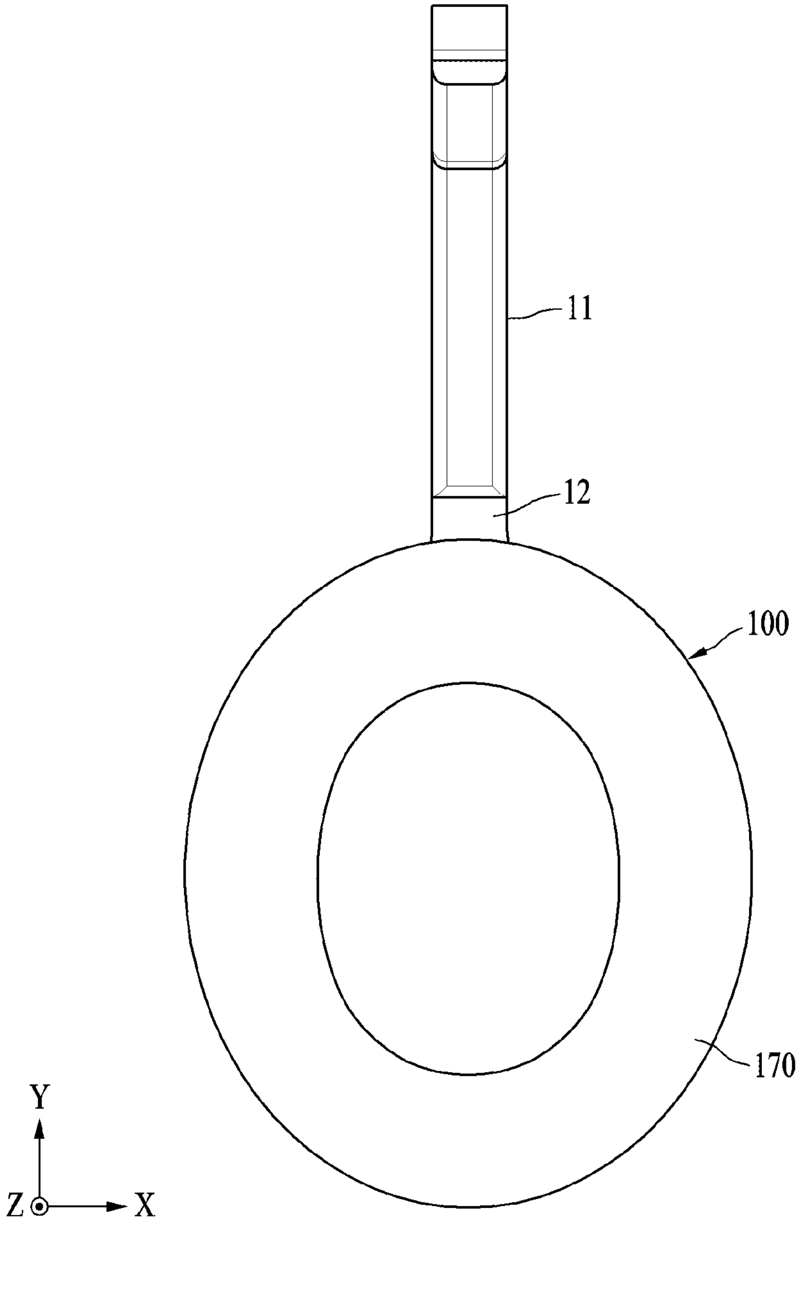
FIG. 4A is a view illustrating a portion of headphones according to an example embodiment.

FIG. 3 is a view illustrating an exploded state of the first earpiece 100 of the headphones 10 according to an example embodiment. FIG. 4A is a view illustrating a portion of headphones according to an example embodiment, FIG. 4B is a front view, viewed from the A direction of FIG. 2 of the portion of the headphones 10 from which a first auxiliary pad and a first earpad are removed, FIG. 4C is a perspective view illustrating the portion of the headphones of FIG. 4B according to an example embodiment, FIG. 5A is a cross-sectional view illustrating the headphones 10 taken along a line B-B of FIG. 4B according to an example embodiment, and FIG. 5B is an example of a first repulsive body of FIG. 5A.

Figure 4B:
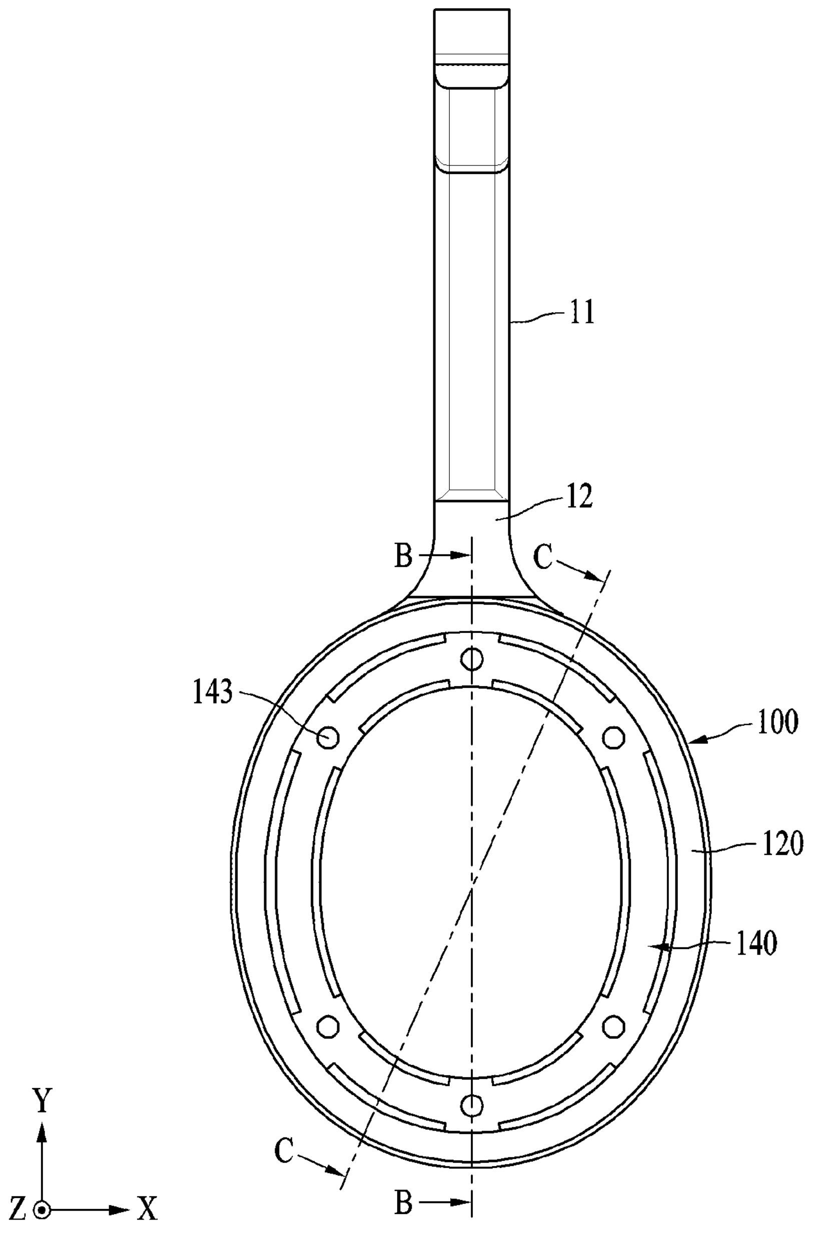
FIG. 4B is a front view illustrating a portion of headphones viewed from the A direction of FIG. 2A, according to an example embodiment.
Figure 4C:
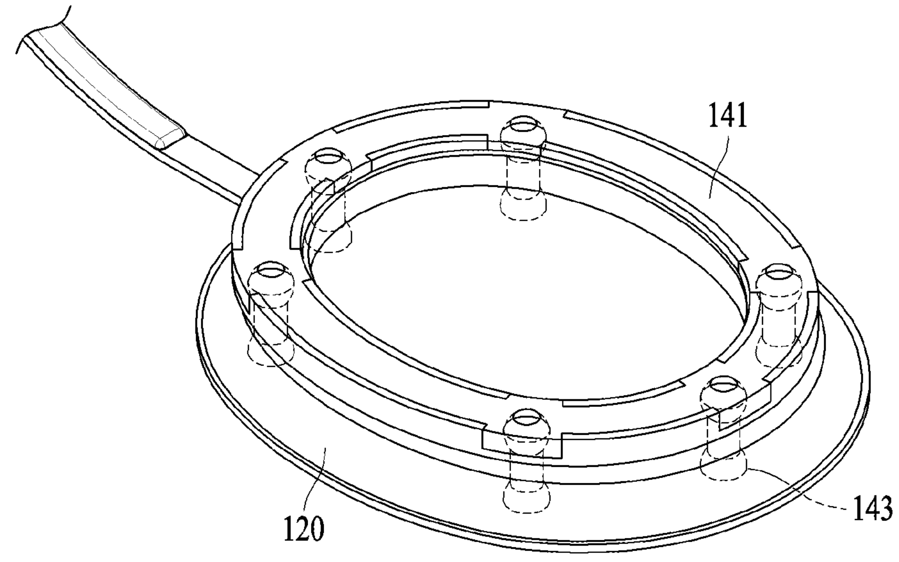
FIG. 4C is a perspective view illustrating the portion of headphones of FIG. 4B according to an example embodiment.
Figure 5A:
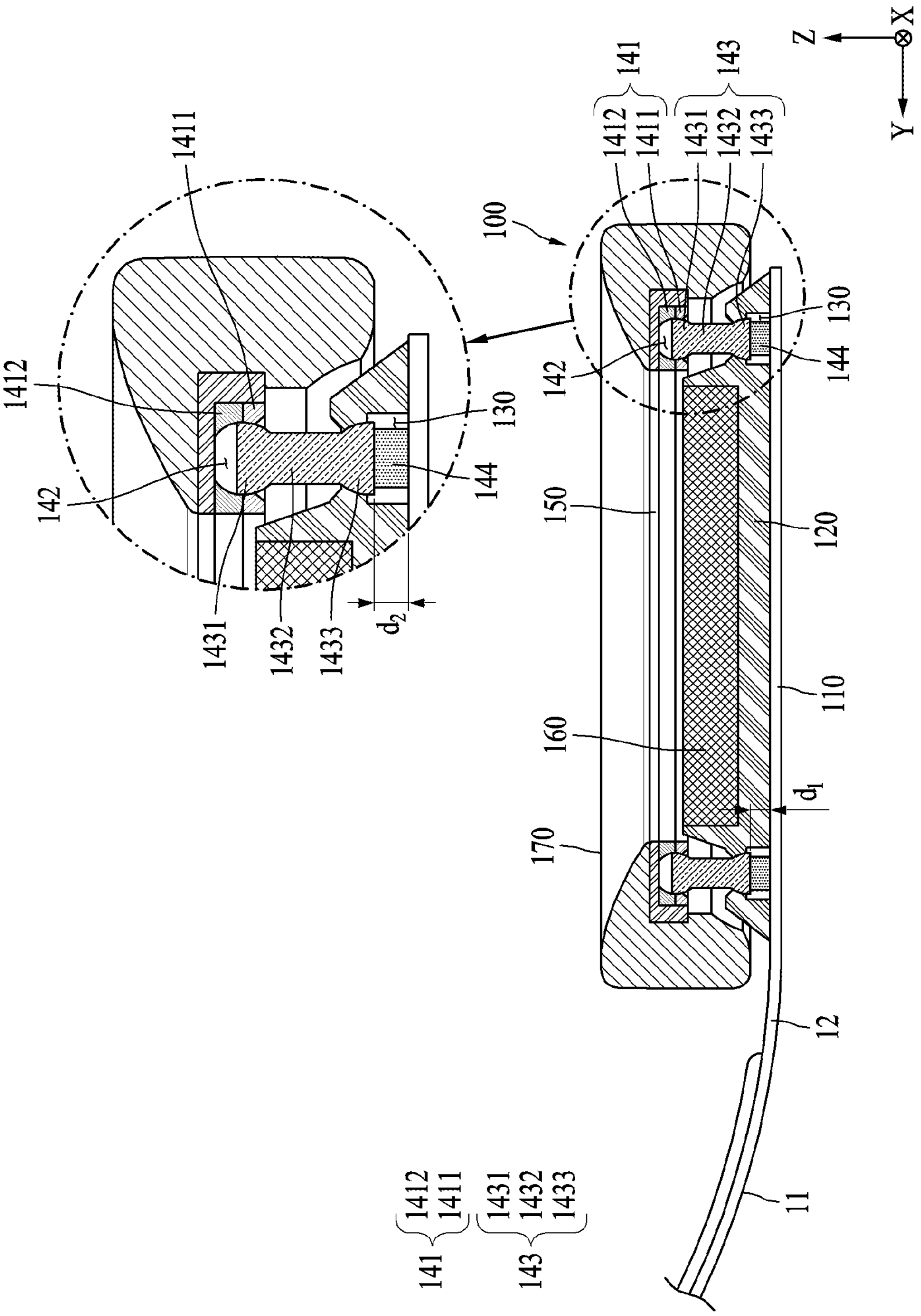
FIG. 5A is a cross-sectional view illustrating headphones taken along a line B-B of FIG. 4B according to an example embodiment and FIG. 5B is an example of a first repulsive body of FIG. 5B according to an example embodiment.
Figure 5B:
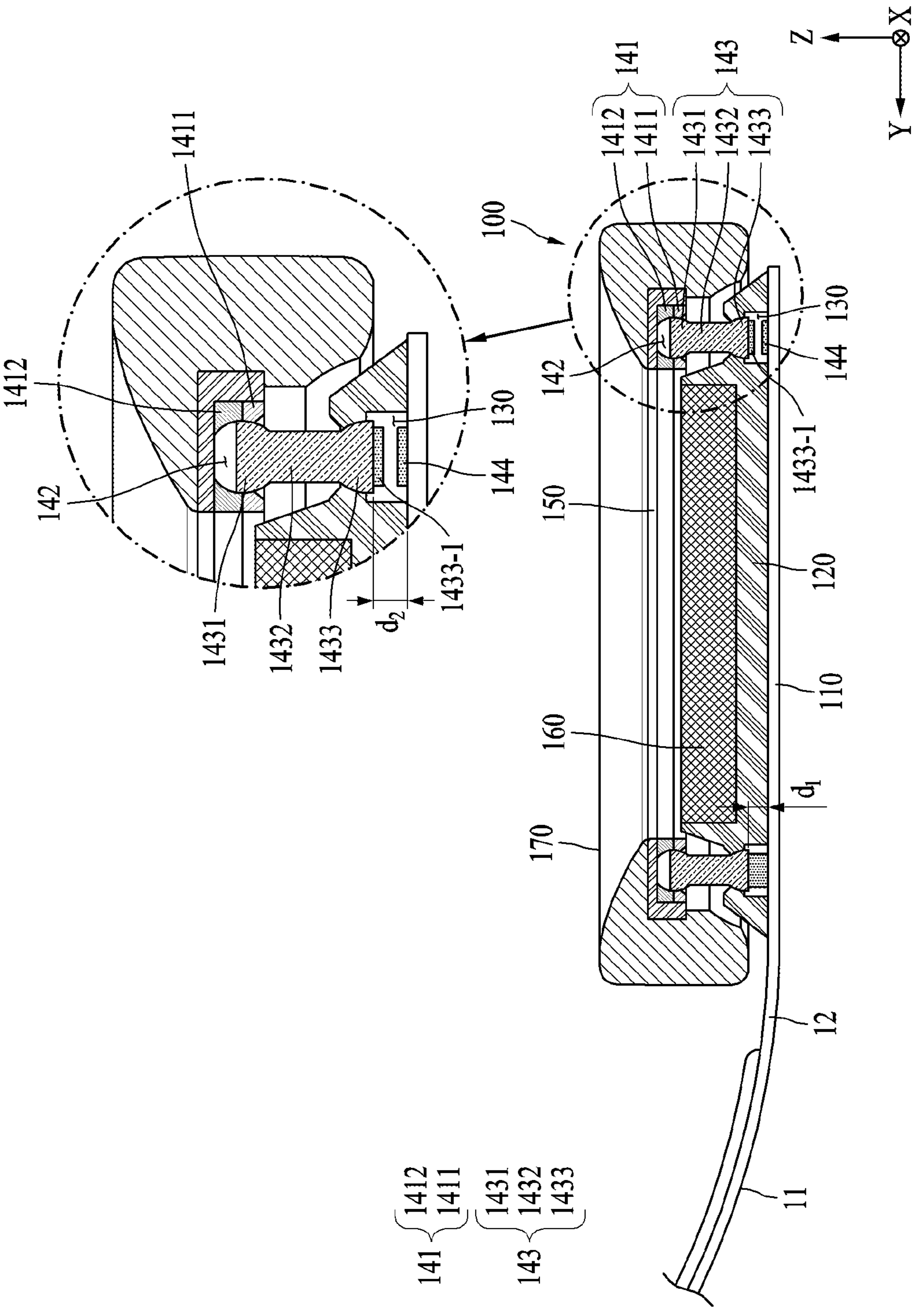

Referring to FIGS. 4B and 4C, FIG. 4B illustrates a state in which an auxiliary pad (e.g., a first auxiliary pad 150 of FIG. 3) and an ear pad (e.g., a first ear pad 170 of FIG. 3) are omitted to clearly show a case where the line B-B as a cross-section passes through a first pressure pin 143 and a case where the line C-C as a cross-section does not pass through the first pressure pin 143. FIG. 4C illustrates the overall shape of the first pressure pin 143 and a first pressure plate 141 of the headphones illustrated in FIG. 4B and a positional relationship.

Hereinafter, a connection relationship of components included in the first earpiece 100 with reference to FIGS. 3 to 5B is described.

In an example embodiment, the first earpiece 100 may include a first plate 110 directly connected, directly or indirectly, to one end of the headband 11 or the first stem 12 and a first housing 120 arranged to be connected, directly or indirectly, to the first plate 110 in a first direction (e.g., the +z direction of FIG. 3 or FIG. 10) perpendicular to one surface of the first plate 110.

For example, the first earpiece 100 may include a first ear pad 170 arranged to face the first direction in the first earpiece 100 and directly contacting the body of the user.

The first earpiece 100 may include a first auxiliary pad 150 arranged to be connected to the first ear pad 170 in a direction opposite to the first direction of the first ear pad 170 and a first pressure unit 140 arranged between the first auxiliary pad 150 and the first housing 120 and contacting the first auxiliary pad 150 and the first housing 120.

The first earpiece 100 may include a first speaker 160 (e.g., the speaker 24 of FIG. 1) configured to provide sound to the user, and the first speaker 160 may be mounted on the surface of the first plate 110 passing through the first auxiliary pad 150 formed of a closed curve, the first pressure unit 140, and the central portion of the first housing 120.

Since the first ear pad 170 may directly contact the body of the user, at least a portion of the first ear pad 170 may include a contractable material (e.g., a foam material, such as a sponge) when receiving pressure.

The degree of flexibility in which the first ear pad 170 contracts may vary depending on the specification of a product. When the first ear pad 170 includes a rigid member that does not contract, the usability thereof may significantly decrease, and when the first ear pad 170 excessively contracts, for example, the user may have a skin disease, such as eczema, since penetrating holes in the foam material clog and the air may not ventilate. Therefore, the degree of contraction of the first ear pad 170 may be determined by considering the aforementioned factors.

On the other hand, since the first ear pad 170 may be formed not to excessively contract due to the aforementioned factors, a distribution effect of the pressure, by the first earpiece 100, applied to the periphery of the right ear of the user may be insufficient due to the flexibility of the first ear pad 170.

On the other hand, when the first ear pad 170 is formed of a foam material, the outside of the first ear pad 170 may be wrapped with a separate material (e.g., fabric or synthetic resin) to prevent or reduce foreign material from entering through a penetrating hole in the foam material. In addition, the inside of the first ear pad 170 may include a penetration part to deliver sound provided by the first speaker 160 to the ear of the user without loss. For example, the first ear pad 170 may be formed in a donut shape. Moreover, when the first ear pad 170 is formed in a donut shape, a filter with a penetrating hole may be formed around the penetration part of the first ear pad 170 to prevent or reduce foreign material (e.g., moisture, dust, etc.) from entering the first speaker 160 configured with electronic components.

As described above, the first speaker 160 may directly provide sound to the ear of the user. The first speaker 160 may include a sound device and a controller (not shown) configured to control the sound device and/or the first pressure unit 140. Various sound functions (e.g., noise-canceling) may be implemented through the controller (not shown). The controller (not shown) configured to control the first pressure unit 140 may be arranged on a location other than the first speaker 160.

As described above, the first speaker 160 may be on the surface of the first plate 110 and a separate member may be disposed between the first speaker 160 and the first plate 110 to prevent or reduce the sound provided by the first speaker 160 from vibrating the first plate 110 or leaking to another surface of the first plate 110.

In an example embodiment, the first auxiliary pad 150 may support the first ear pad 170 with respect to the first pressure unit 140. Referring to FIGS. 4 and 5A, the first auxiliary pad 150 may be arranged in the first direction of the first pressure unit 140 and the first ear pad 170 may be arranged in the first direction of the first auxiliary pad 150. The headphones 10 according to an example embodiment may include the first auxiliary pad 150 between the first pressure unit 140 and the first ear pad 170 since the pressure distributed by the first pressure unit 140 may not be transmitted to the body of the user because of the flexibility of the first ear pad 170.

The first auxiliary pad 150 may be integrally formed with the first ear pad 170 or the first auxiliary pad 150 may not be provided, and a portion, of the first ear pad 170, facing the first plate 110 may be formed more rigid than other portions of the first ear pad 170 such that the first ear pad 170 may be directly supported by the first pressure unit 140.

In an example embodiment, the headphones 10 may include the first pressure unit 140 configured to evenly distribute pressure for wearing the headphones 10 on the body of the user.

Referring to FIG. 3, the first pressure unit 140 may include the first pressure plate 141 (see FIGS. 7 and 8) contacting the first auxiliary pad 150 and the first pressure pins 143 connected, directly or indirectly, to the first pressure plate 141 and the first housing 120.

The first pressure unit 140 illustrated as FIG. 3 is an example embodiment of a pressure unit, and the first pressure unit 140 may be variously implemented. A pressure unit according to another embodiment is described after providing a description of the first pressure unit 140 according to an example embodiment.

The first housing 120 of the headphones 10 may be formed such that a surface of the first housing 120 appropriately contacts the first plate 110. In addition, the inner side of the first housing 120 may be penetrated to accommodate the first speaker 160 therein.

In the first housing 120, a plurality of first housing grooves 130 may be formed along a circumference of the first housing 120. At least a portion of the first pressure pin 143 may be unconstrainedly accommodated in the first housing groove 130. Since at least a portion of the first pressure pin 143 may be unconstrainedly accommodated in the first housing groove 130, the first pressure pin 143 may be allowed to move relative to the first housing 120. For example, the first pressure pin 143 may be accommodated in the first housing groove 130 and may vertically move in a direction (e.g., the ±Z direction of FIG. 3) close to or far from the first pressure plate 141 in a predetermined range. As respective ends 1433 of the plurality of first pressure pins 143 are accommodated in the first housing grooves 130, the first pressure plate 141 supported by the other ends 1431 of the first pressure pins 143 may tilt with respect to the first housing 120. This will be described below.

For example, the first housing grooves 130 may be randomly arranged in the first housing 120, may be arranged in equal angles based on the center of a surface of the first plate 110, may be symmetrically arranged based on one axis (e.g., the X axis or the Y axis of FIG. 3), or may be symmetrically arranged based on an axis on a plane (e.g., the X-Y plane of FIG. 3). In addition, the first housing grooves 130 may be point-symmetrically arranged based on the center of the surface of the first plate 110.

Two or more of the first housing grooves 130 may be provided.

In an example embodiment, the first pressure plate 141 may include a first pressure plate main body 1411 and a first pressure plate sub body 1412 coupled, directly or indirectly, to the first pressure plate main body 1411.

The first pressure plate main body 1411 and the first pressure plate sub body 1412 may be integrally formed (see FIGS. 7 and 8) as the first pressure plate 141. Alternatively, for ease of a manufacturing process, for easily accommodating at least a portion of the first pressure pin 143 in a first pressure plate groove 142 formed in the first pressure plate 141, or for other purposes, the first pressure plate main body 1411 and the first pressure plate sub body 1412 may be divided and separately formed as illustrated.

Figure 6:
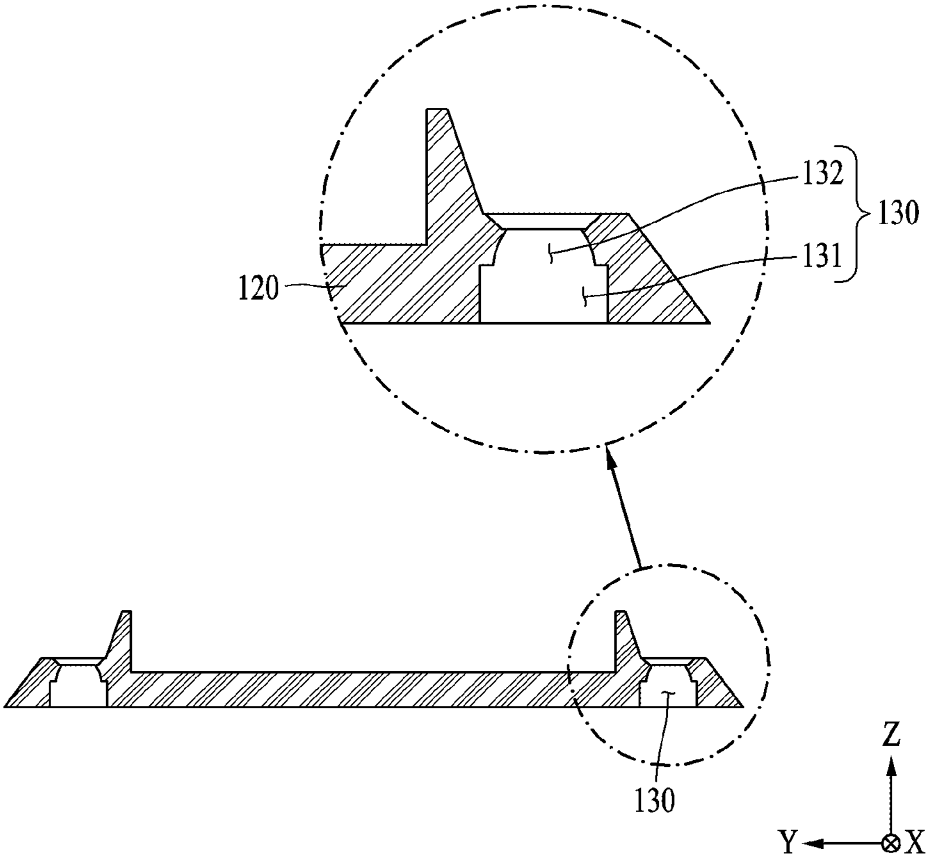
FIG. 6 is a cross-sectional view illustrating a first housing of the headphones taken along a line B-B of FIG. 4B according to an example embodiment.
Figure 7:
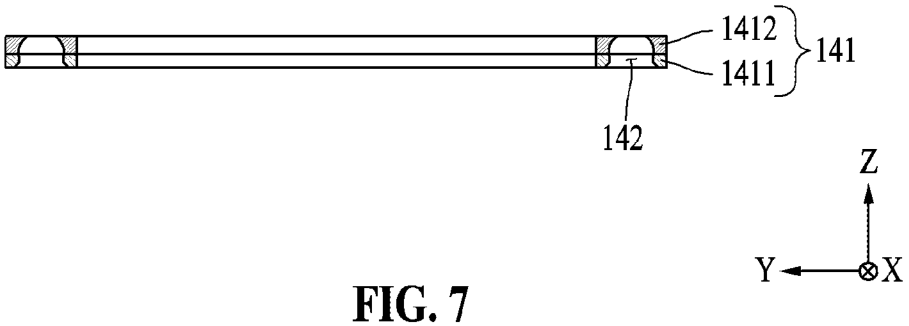
FIG. 7 is a cross-sectional view illustrating a first pressure plate and a first pressure plate groove of the headphones taken along a line B-B of FIG. 4B according to an example embodiment.
Figure 8:
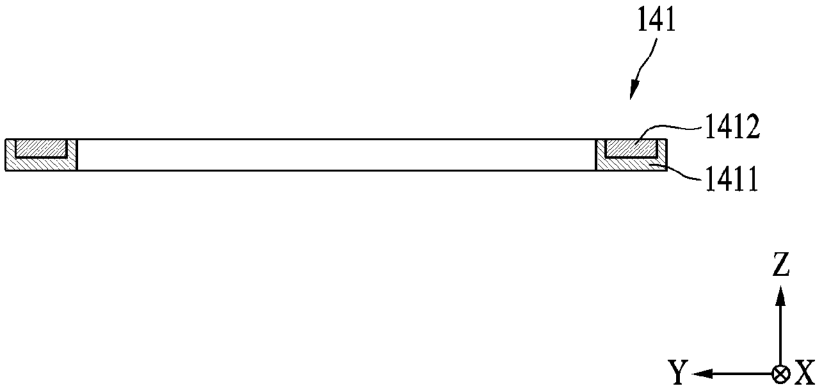
FIG. 8 is a cross-sectional view illustrating the first pressure plate and the first pressure plate groove of the headphones taken along a line C-C of FIG. 4B according to an example embodiment.
Figure 9:
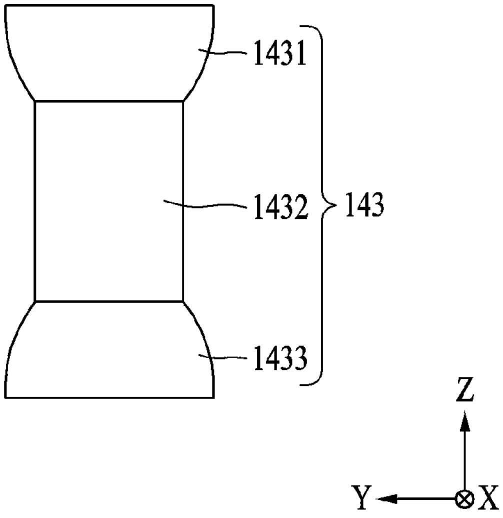
FIG. 9 is a front view of a first pressure pin of the headphones according to an example embodiment.

Referring to FIG. 5A, as described above, the end 1431 of the first pressure pin 143 may be unconstrainedly accommodated in the first pressure plate groove 142 and the other end 1433 of the first pressure pin 143 may be unconstrainedly accommodated in the first housing groove 130. In addition, when the user does not wear headphones (e.g., the headphones 10 of FIG. 2), since an external force does not apply to the first earpiece 100, the plurality of first pressure pins 143 may be accommodated in the first pressure plate grooves 142 and the first housing grooves 130 in the same depth, and thus, the first pressure plate 141 may be oriented in parallel with the surface of the first plate 110. For example, the plurality of first pressure pins 143 may be accommodated in the first housing grooves 130 in the same depth, when there is no external force. FIG. 6 is a cross-sectional view illustrating a first housing of the headphones 10 taken along a line B-B of FIG. 4B according to an example embodiment, FIG. 7 is a cross-sectional view illustrating the first pressure plate 141 and the first pressure plate groove 142 of the headphones 10 taken along a line B-B of FIG. 4B according to an example embodiment, FIG. 8 is a cross-sectional view illustrating the first pressure plate 141 and the first pressure plate groove 142 of the headphones 10 taken along a line C-C of FIG. 4B according to an example embodiment, and FIG. 9 is a front view of the first pressure pin 143 of the headphones 10 according to an example embodiment. To clearly describe an arrangement relationship of the first pressure unit 140 and the first housing groove 130, hereinafter, a cross-sectional view of FIG. 5A is referred together.

Referring to FIG. 6, the first housing 120 of the headphones 10 according to an example embodiment is shown. A first speaker (e.g., the first speaker 160 of FIG. 5A) may be accommodated in the inside of the first housing 120. The first housing groove 130 formed in the first housing 120 may include a ball part 132 and a straight line part 131 in the opposite direction to the first direction from the ball part 132. The ball part 132 may have a shape in which the diameter thereof narrows toward one side (e.g., the +Z direction of FIG. 6) of the first housing groove 130, and an end of the ball part 132 provided on the opposite side of the straight line part 131 may be connected, directly or indirectly, to an expansion area.

On the other hand, unlike illustrated in FIGS. 5A and 6, the straight line part 131 may be significantly short or omitted as the ball part 132 is formed to extend toward the first plate 110, or the ball part 132 may be significantly short or omitted as the straight line part 131 extends toward the first direction.

Referring to FIG. 5A, the end 1433 of the first pressure pin 143 may be unconstrainedly accommodated in the first housing groove 130.

The first repulsive body 144 may be accommodated in the first housing groove 130. One side and/or the other side of the first repulsive body 144 may be supported by the first pressure pin 143 or the first housing 120.

The first repulsive body 144 of the headphones 10 according to an example embodiment may include an elastic body, a permanent magnet, or an electromagnet. For example, the elastic body may include a spring. For example, the spring may include a coil spring extending from the first housing 120 to the first pressure pin 143.

When the first repulsive body 144 is an elastic body, an end and the other end of the elastic body may be supported by the first housing 120 and the first pressure pin 143 and the first pressure pin 143 may be pressed in the first direction or the opposite direction in the first housing groove 130 by an elastic force of the elastic body.

Referring to FIG. 5B, when the first repulsive body 144 is a permanent magnet or an electromagnet, a magnet 1433-1 may be provided at the end 1433 of the first pressure pin 143 and the first repulsive body 144 may press the first pressure pin 143 in the first direction without contacting the other end 1433 of the first pressure pin 143. In this case, the first repulsive body 144 that is a permanent magnet or an electromagnet may be arranged inside the first housing groove 130 and the first pressure pin 143 may be spaced apart from the first repulsive body 144 by the magnet 1433-1. In the case where the first repulsive body 144 includes a permanent magnet or an electromagnet, the first repulsive body 144 may have a relatively thin thickness (e.g., the length of the first repulsive body 144 in the +Z direction of FIG. 5) compared to the case where the first repulsive body 144 includes an elastic body. In an example embodiment, the magnet 1433-1 may be omitted when the first pressure pin 143 includes a material having a magnetic force.

On the other hand, when the first repulsive body 144 includes an electromagnet, the strength of the electromagnet may be controlled by a controller (not shown). In an example embodiment, the controller may control the strength of the electromagnet to optimize pressure applied to the face of the user. In an example embodiment, a magnetic force of the magnet 1433-1 may be set to optimize the pressure applied to the face of the user.

Referring to FIGS. 7 and 8, the first pressure plate groove 142 may be formed in the first pressure plate 141.

In an example embodiment, referring to FIGS. 3 and 4B, a plurality of first pressure plate grooves 142 may be provided along the circumference of the first pressure plate 141. Referring to FIG. 5A, a plurality of first pressure plate grooves 142 may be provided at positions respectively corresponding to housing grooves (e.g., the first housing groove 130 of FIG. 5A) such that the ends 1431 of the pressure pins (e.g., the first pressure pin 143 of FIG. 5A) may be accommodated in the first pressure plate grooves 142, respectively. In addition, the plurality of first pressure plate grooves 142 may be arranged in various orientations on the circumference of the first pressure plate 141. For example, the plurality of first pressure plate grooves 142 may be line-symmetrically arranged based on an arbitrary line, passing through the center of the first pressure plate 141, on the surface of the first pressure plate 141 and may be point-symmetrically arranged based on the center of the first pressure plate 141.

As described above, the first pressure plate 141 may include the first pressure plate main body 1411 and the first pressure plate sub body 1412, which are described together as the first pressure plate 141.

The first pressure plate groove 142 may be shaped to accommodate the end 1431 of the first pressure pin 143. For example, when the end 1431 of the first pressure pin 143 has a spherical shape, the first pressure plate groove 142 may be a groove in a spherical shape and spaced apart from the spherical shape of the end 1431 of the first pressure pin 143 to accommodate the end 1431 therein. For example, the inner diameter of the first pressure plate groove 142 may be configured to increase and decrease in the opposite direction to the first direction.

The first pressure pin 143 may be unconstrainedly accommodated in the first pressure plate groove 142. When the first pressure pin 143 is unconstrainedly accommodated in the first pressure plate groove 142, for smooth movement of the first pressure pin 143, a portion facing the direction opposite to the first direction (e.g., the +Z direction of FIG. 7) of the first pressure plate groove 142 may be wider than a portion facing the first direction. Through this, smooth inclination of the first pressure plate 141 with respect to the first pressure pin 143 may be allowed.

FIG. 9 illustrates the first pressure pin 143. The first pressure pin 143 may include a body 1432 extending in the longitudinal direction of the first pressure pin 143 and at least a portion of the end 1431 and the other end 1433 of the first pressure pin 143 connected, directly or indirectly, to the body 1432 of the first pressure pin 143 may have a spherical shape. For example, the end 1431 and the other end 1433 of the first pressure pin 143 may have a partially cut spherical shape and the body 1432 of the first pressure pin 143 may have a cylindrical shape.

A position of a cutout of the spherical shape of the end 1431 and the other end 1433 of the first pressure pin 143 may vary. For example, in a surface direction perpendicular to the longitudinal direction of the first pressure pin 143, a point away from the body 1432 of the first pressure pin 143 based on the center of the spherical shape of the first pressure pin 143 may be cut. In this case, a diameter of the cutout portion of the spherical shape may be greater than the diameter of the body 1432 of the first pressure pin 143.

In an example embodiment, the end 1431 and the other end 1433 of the first pressure pin 143 may not be a spherical shape and may be a shape extending in a straight line from the body 1432 of the first pressure pin 143. In this case, the size of a cross-section in a transverse direction (e.g., the X direction or the Y direction of FIG. 9) of the extended straight line portion may be greater than the size of a cross-section in the transverse direction of the body 1432.

Figure 10:
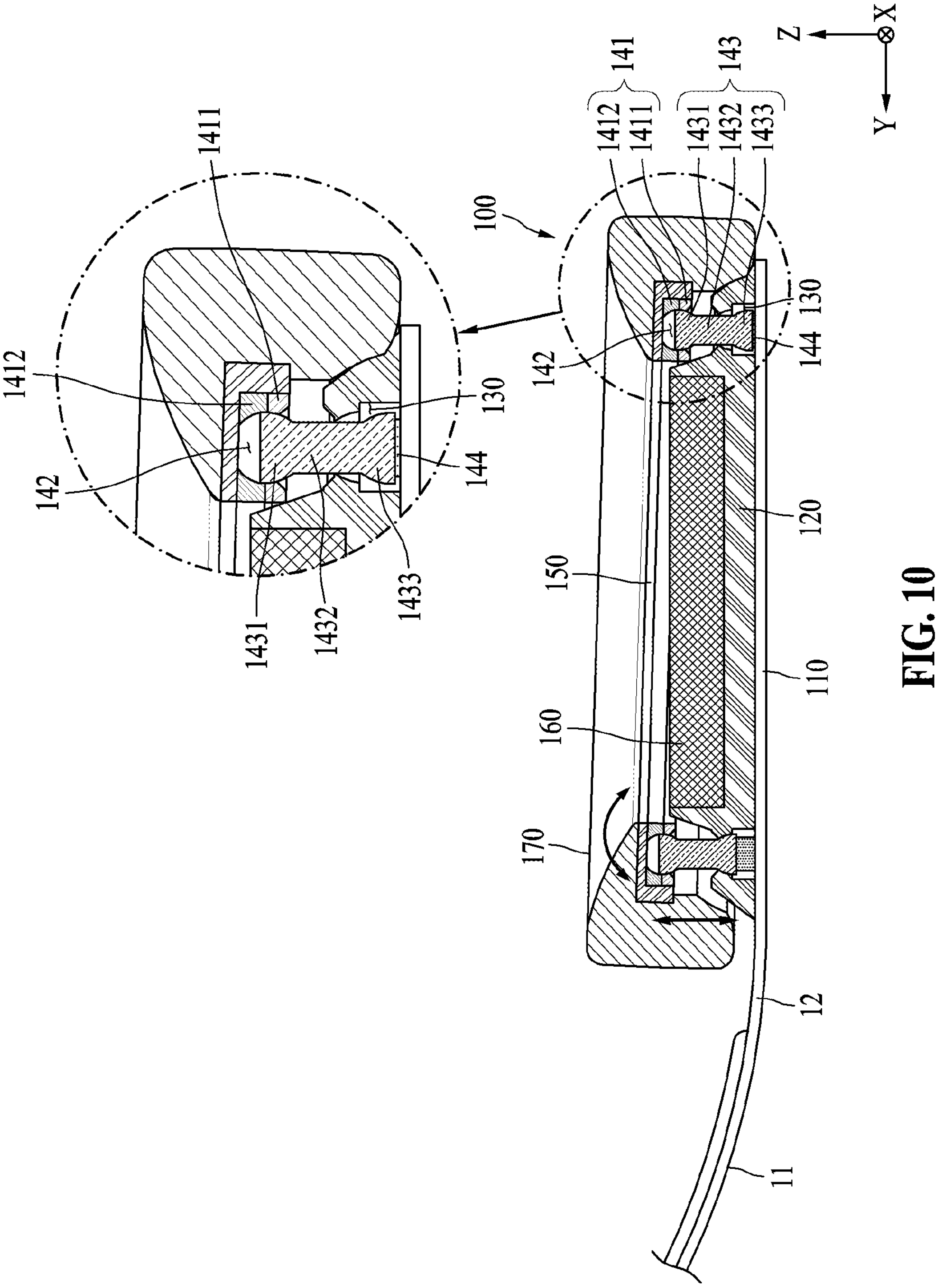
FIG. 10 is a cross-sectional view illustrating a tilted state of a first earpad of the headphones taken along a line B-B of FIG. 4B according to an example embodiment.
Figure 11A:
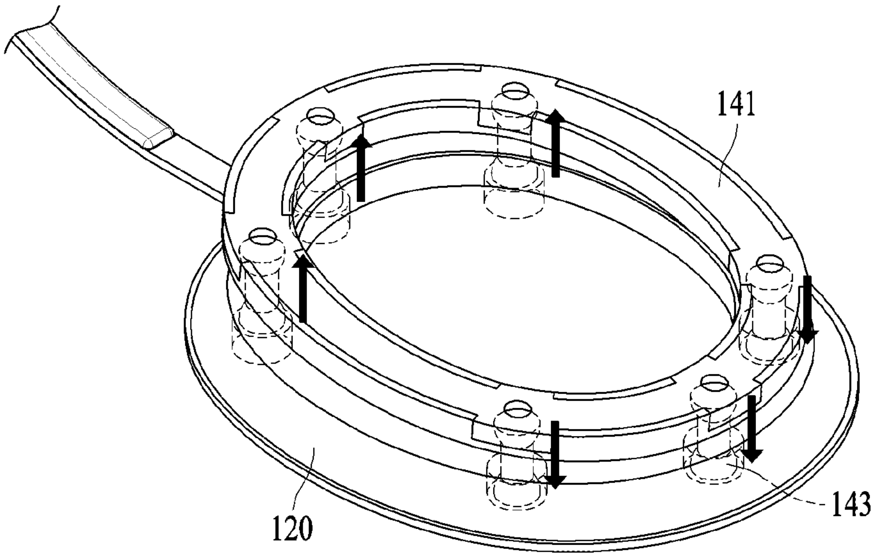
FIGS. 11A and 11B are views illustrating a tilted state of a first pressure plate in a portion of the headphones of FIG. 4C according to an example embodiment.
Figure 11B:
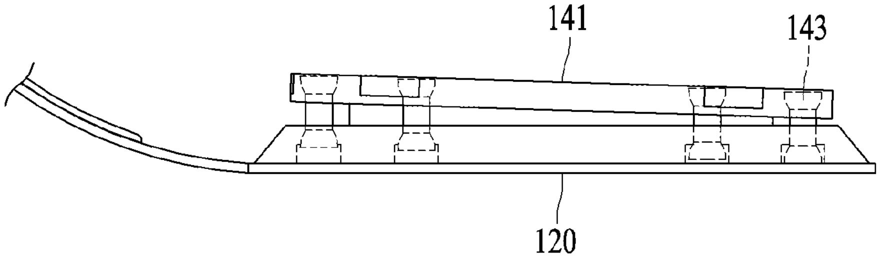

FIG. 10 is a cross-section of the headphones 10 taken along the line B-B of FIG. 4B and illustrates a tilted state of the first earpiece 100, and FIGS. 11A and 11B are views illustrating a tilted state of the first pressure plate 141 in a portion of the headphones of FIG. 4C according to an example embodiment.

Hereinafter, a connection relationship and movement of the components described above are described with reference to FIGS. 10, 11A, 11B, 4C, and 5A.

As described above, the end 1431 of the first pressure pin 143 may be accommodated in the first pressure plate groove 142 and the other end 1433 of the first pressure pin 143 may be accommodated in the first housing groove 130. In addition, the plurality of first pressure pins 143 may be provided and corresponding to them, the plurality of the first pressure plate grooves 142 and the plurality of the first housing grooves 130 may be provided. Thus, the plurality of first pressure pins 143 may be respectively accommodated in the first pressure plate grooves 142. In addition, as described above, since the plurality of first pressure pins 143 may be radially or symmetrically arranged, the pressure applied to the first earpiece 100 may be evenly distributed.

The first housing groove 130 according to an example embodiment may include the straight line part 131 (e.g., see FIG. 6), and thus, in the straight line part 131, the first pressure pin 143 may move in the opposite direction (e.g., the −Z direction of FIG. 10) to the first direction while receiving resistance of the first repulsive body 144. For example, when the first pressure pin 143 (e.g., the first pressure pin 143 in the −Y direction from the center of the first housing 120 of FIG. 10) moves in the opposite direction to the first direction, the other pressure pin (e.g., the first pressure pin in the +Y direction from the center of the first housing 120 of FIG. 10) on the opposite side may simultaneously move in the opposite direction to the first direction or may maintain the position as illustrated. Alternatively, when an external force applied to the other pressure pin has removed, the other pressure pin may move in the first direction. For example, referring to FIG. 10, as the plurality of first pressure pins 143 moves in the first direction or the opposite direction, the first pressure plate 141 supported by the plurality of first pressure pins 143 may tilt with respect to the first housing 120. In this case, as the ends 1431 and 1433, of the first pressure pin 143, in the spherical shape are unconstrainedly accommodated in the first pressure plate groove 142 and the ball part 132 (e.g., see FIG. 6), inclination of the first pressure plate 141 may be smoothly performed. All pressure pins included in the first earpiece 100 may be independently moved, and the first earpiece 100 may tilt to fit various head shapes.

For example, since some of the first pressure pins 143 may move in the first direction and some other ones of the first pressure pins 143 may move in the opposite direction to the first direction, each of the first pressure pins 143 may move in the first direction or the opposite direction along a face curve of the user and the first earpiece 100 may also incline along the face curve, and thus, the pressure applied to the face of the user may be evenly distributed. When each of the first pressure pins 143 moves in a different direction, as illustrated in FIGS. 11A and 11B, the first pressure plate 141 may be oriented to tilt relative to the first housing 120.

For example, before the user wears the headphones 10 according to an example embodiment, the plurality of first pressure pins 143 may be arranged in a predetermined distance from the first housing 120 and accordingly, the first pressure plate 141 may be arranged at a location oriented parallel with the first housing 120. When the user wears the headphones 10 according to an example embodiment, the first pressure plate 141 may tilt as the first ear pad 170 is pressed along the face curve of the user. Since the first pressure plate 141 is connected, directly or indirectly, to the first housing 120 by the ends 1431 and 1433 of the first pressure pin 143, which are spherical, the plurality of first pressure pins 143 may push the first pressure plate 141 in the first direction (e.g., the +Z direction of FIG. 10) while the first pressure plate 141 tilts with respect to the first housing 120, and the pressure applied to the first pressure plate 141 may be distributed. Through this, the pressure applied to the first ear pad 170 connected, directly or indirectly, to the first pressure plate 141 may be evenly distributed.

On the other hand, as the straight line part 131 of the first housing groove 130 increase, the first pressure plate 143 may move more, and thus, the degree of inclination of the first earpiece 100 may increase.

In addition, at least a portion of the first pressure pin 143, the first pressure plate groove 142, and the first housing groove 130 may be formed in a spherical shape, and thus, may move relative to each other. For example, when some of pressure pins (e.g., the first pressure pins 143) move in the first direction and the others move in the opposite direction to the first direction, as illustrated in FIG. 10, inclination may occur between the first pressure plate groove 142 and the first pressure pin 143 and between the first pressure pin 143 and the first housing groove 130. The ends and grooves in the spherical shape may be formed to allow the inclination. Accordingly, the first earpiece 100 may fluidly move along various face curvatures.

On the other hand, as the diameter of the spherical shape increases, movement between the first pressure plate groove 142 and the first pressure pin 143 and between the first pressure pin 143 and the first housing groove 130 may be smoother. FIG. 10 illustrates the movement between the first pressure pin 143 and the first pressure plate groove 142 and between the first pressure pin 143 and the first housing groove 130. FIG. 10 illustrates vertical movement of the first pressure pin 143 in a straight arrow and inclination of the first pressure plate 141 with respect to the first housing 120 according to the movement of the first pressure pin 143 in a curved arrow.

In an example embodiment, a straight line part (e.g., the straight line part 131 of FIG. 10) may be formed in a pressure plate groove (e.g., the first pressure plate groove 142 of FIG. 10), not in a housing groove (e.g., the first housing groove 130 of FIG. 10), and in this case, in the pressure plate groove, a pressure plate (e.g., the first pressure plate 141 of FIG. 10) may move with respect to a pressure pin (e.g., the first pressure pin 143 of FIG. 10).

In an example embodiment, a housing groove (e.g., the first housing groove 130 of FIG. 10) and/or a pressure plate groove (e.g., the first pressure plate groove 142 of FIG. 10) and/or a pressure pin (e.g., the first pressure pin 143 of FIG. 10) may not have a spherical shape. For example, the housing groove and/or the pressure plate groove may be a groove having a larger inner diameter than a diameter of the pressure pin.

In addition, since the headphones 10 according to an example embodiment may include the first pressure pin 143 and the first repulsive body 144 that is controllable, pressure applied to each point of the first pressure plate 141 may be individually adjusted. Since the first repulsive body 144 may be individually adjusted based on the use environment of the user, distribution of the pressure applied by the first earpiece 100 may be optimized according to various face types. This adjustment may be applied based on an average value of forces applied to the first pressure pins 143, which are radially arranged. Through this, a service for user-friendly customized headphones may be provided.

Figure 12B:
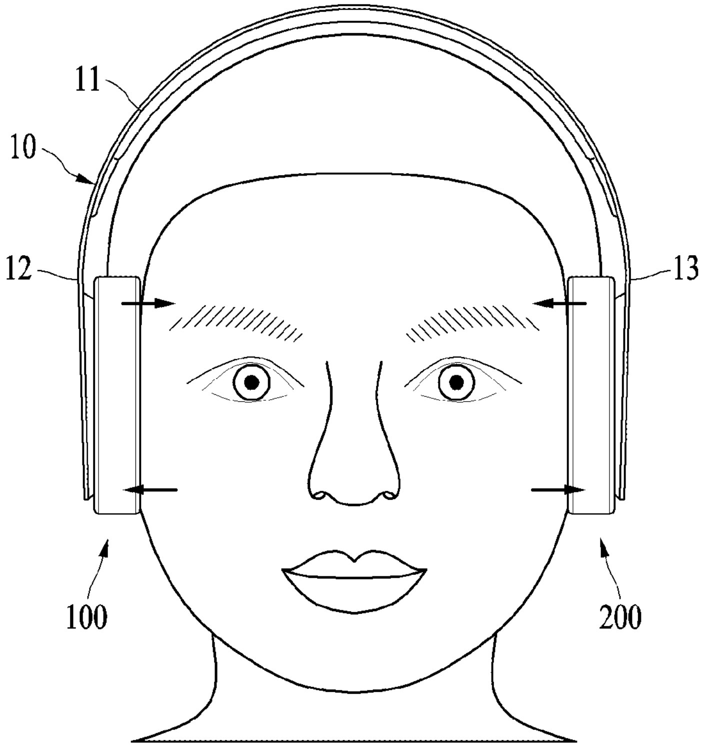
FIG. 12B is a view illustrating a state of use of the headphones according to an example embodiment.

FIG. 12A is a view illustrating a state of use of the headphones 10 according to an example embodiment, and FIG. 12B is a view illustrating a state of use of the headphones 10 according to an example embodiment.

When the user wears the headphones 10, a first ear pad (e.g., the first ear pad 170 of FIG. 3) may contact the face of the user and the first ear pad may be pressed by the pressure according to adhesion. The first ear pad may transmit the pressure to a first pressure plate (e.g., the first pressure plate 141 of FIG. 3) of a first pressure unit (e.g., the first pressure unit 140 of FIG. 3) connected, directly or indirectly, to the first ear pad. The first pressure unit may include components (e.g., the first pressure pin 143 of FIG. 3 and the first repulsive body 144 of FIG. 3) for distributing the pressure applied to the first pressure unit and because of the components, the first pressure plate may tilt to fit a face shape of a person. The first pressure pin 143 that may vertically move may evenly press the first pressure plate from a plurality of points through the first repulsive body, the pressure applied to the human face from the first ear pad may be evenly distributed.

The first earpiece 100 and the second earpiece 200 of the headphones 10 according to an example embodiment may tilt to fit various types of head shapes as illustrated in FIGS. 12A and 12B. Accordingly, the headphones 10 may not need a hinge structure for inclining the first earpiece 100 and the second earpiece 200 and may have a slim external figure as a space for accommodating the hinge structure is not necessary.

The headphones 10 according to an example embodiment may include a plurality of first pressure pins 143, and thus, may have a plurality of pressure points. Accordingly, the pressure applied to the user's body by the first earpiece 100 may be distributed to several points, not concentrated to a predetermined point, and the user may feel less fatigue or pain even when wearing the headphones 10 for a long time.

In addition, since the pressure applied to the user's body by the first earpiece 100 of the headphones 10 according to an example embodiment may be distributed to several points by individual movement of the plurality of first pressure pins 143, the first earpiece 100 may be closely contact various three-dimensional face shapes.

In addition, the headphones 10 according to an example embodiment may provide an experience to a user, such as a listening environment with low sound loss to various users with various face shapes as the headphones 10 closely contact various three-dimensional face shapes.

In addition, since the pressure distributed to several points may be adjusted by the plurality of first repulsive bodies 144, adhesion of the headphones 10 may be adjusted or controlled depending on various three-dimensional face shapes.

On the other hand, a wearable device (not shown) according to an example embodiment may include a contact piece including a display for sight corresponding to an earpiece (e.g., the first earpiece of FIG. 5A) for hearing and the contact piece may be mounted around the eyes of a user.

Similar to headphones (e.g., the headphones 100 of FIGS. 3-5) according to an example embodiment, the wearable device (not shown) may include a headband and the contact piece may include a housing, a contact pad, and a pressure unit.

The pressure unit may be implemented in the same configuration and shape as the pressure unit (e.g., the first pressure unit 140) described above, and thus, may evenly or substantially evenly distribute the pressure around the eyes of a user and may be mounted around the eyes of a user.

In an example embodiment, the headphones 10 may include the headband 11, the first earpiece 100 connected, directly or indirectly, to an end of the headband 11, and the second earpiece 200 connected, directly or indirectly, to the other end of the headband 11, wherein the first earpiece 100 may include the first plate 110 connected, directly or indirectly, to an end of the headband 11, the first housing 120 arranged on a surface of the first plate 110, the first ear pad 170 contacting the first housing 120 and aligned in a first direction in which the first plate 110 and the first housing 120 are arranged, and the first pressure unit 140 between the first ear pad 170 and the first housing 120, wherein the first pressure unit 140 may include the first pressure plate 141, and the first pressure pin 143 between the first pressure plate 141 and the first housing 120, wherein a portion of the first pressure pin 143 may be unconstrainedly accommodated in an inside of the first pressure plate 141, wherein the first pressure plate is tiltable relative to the first housing.

In an example embodiment, the first housing 120 may include the plurality of first housing grooves 130 along a circumference of the first housing 120, in the first pressure pin 143, a portion connected to the first housing 120 may be unconstrainedly accommodated in the first housing grooves 130, and the first pressure pin may be movable in a direction approaching the first pressure plate from the first housing or in a direction away from the first pressure pin.

In an example embodiment, the first pressure plate 141 may have a ring shape and be arranged to contact the first ear pad 170 along a circumference of the first ear pad 170, a plurality of first pressure pins 143 may be provided, the end 1431 of the first pressure pin 143 may be connected to the first pressure plate 141, and the other end 1433 of the first pressure pin 143 may be accommodated in the first housing grooves 130.

In an example embodiment, at least some of the first housing grooves 130 may be symmetrically arranged with respect to a line extending from one end of the headband 11.

In an example embodiment, the first pressure pins 143 may be unconstrainedly connected to the first pressure plate 141 as each of the ends 1431 of the first pressure pins may be accommodated in a plurality of first pressure plate grooves 142 provided along a circumference of the first pressure plate 141.

In an example embodiment, the end 1431 of the first pressure pin 143 may have a partially cut spherical shape, a spherical portion of the end 1431 of the first pressure pin 143 may be connected to the body 1432 of the first pressure pins 143, and a portion of each of the first pressure plate grooves 142 has a spherical shape corresponding to the end 1431 of the first pressure pin 143.

In an example embodiment, the spherical shape of the end 1431 of the first pressure pin 143 may be cut, in a surface direction perpendicular to a longitudinal direction of the first pressure pin 143, at a point distancing from the body 1432 the first pressure pin 143 based on the center of the spherical shape of the first pressure pin 143.

In an example embodiment, at least a portion of each of the first housing grooves 130 may include the straight line part 131 provided in a direction perpendicular to a surface where the first pressure plate 141 contacts the first ear pad 170.

In an example embodiment, the other end 1433 of the first pressure pin 143 may have a partially cut spherical shape, the spherical shape of the first pressure pin 143 may be cut, in a surface direction perpendicular to a longitudinal direction of the first pressure pin 143, at a point distancing from the body 1432 the first pressure pin 143 based on the center of the spherical shape of the first pressure pin 143, each of the first housing grooves 130 may include the ball part 132 that may be a groove in a cut spherical shape, and the ball part 132 may be connected to the straight line part 131 of the first housing grooves 130 and provided at a side facing the first pressure plate 141 from the straight line part 131 of the first housing grooves 130.

In an example embodiment, the end 1431 of the first pressure pin 143 may be symmetrical to the other end 1433 of the first pressure pin 143 based on the center of the first pressure pin 143. "Based on" as used herein covers based at least on.

In an example embodiment, the first housing 120 may include first repulsive bodies 144 respectively accommodated in straight line parts 143 of grooves in the first housing 120 and configured to accommodate at least a portion of the first pressure pin 143.

In an example embodiment, the first repulsive body 144 may include an elastic body.

In an example embodiment, first repulsive body 144 may include an electromagnet, and a strength of the electromagnet of the first repulsive body 144 may be controlled by a controller provided inside of the first housing 120 or separately provided.

In an example embodiment, the radius of the spherical shape of the end 1431 of the first pressure pin 143 may be greater than the radius of a body 1432 portion between the end 1431 and the other end 1433 of the first pressure pin 143.

In an example embodiment, a wearable device may include a band, and a contact piece connected to an end and the other end of the band, wherein the contact piece may include a housing connected to the band, a contact pad on a side of the housing, and a pressure unit between the housing and the contact pad, wherein the pressure unit may include a pressure plate connected to the housing, and a pressure pin between the pressure plate and the housing, wherein a portion of the pressure pin is unconstrainedly accommodated in an inside of the pressure plate.

In an example embodiment, the housing may include a plurality of housing grooves along a circumference of the housing, and in the pressure pin, a portion connected to the housing may be unconstrainedly accommodated in the housing grooves, In an example embodiment, the pressure pins may be unconstrainedly connected to the pressure plate as the ends of the pressure pins are accommodated in a plurality of pressure plate grooves, respectively, provided along a circumference of the pressure plate, an end and the other end of the pressure pin may have a partially cut spherical shape, and at least a portion of each of the housing grooves may include a straight line part provided in a direction perpendicular to a surface where the pressure plate contacts the contact pad.

In an example embodiment, repulsive bodies including an elastic body or an electromagnet may be accommodated in the straight line parts, respectively.

In an example embodiment, the radius of the spherical shape of the end of the pressure pin may be greater than the radius of a body portion between the end and the other end of the pressure pin.

Each embodiment herein may be used in combination with any other embodiment(s) described herein.

In an example embodiment, the headphones 10 may include the headband 11, the first earpiece 100 connected to an end of the headband 11, and the second earpiece 200 connected to the other end of the headband 11, wherein the first earpiece 100 may include the first plate 110 connected to an end of the headband 11, the first housing 120 arranged on, directly or indirectly, a surface of the first plate 110, the first ear pad 170 contacting the first housing 120 and aligned with the first housing in a first direction in which the first plate 110 and the first housing 120 are arranged, and the first pressure unit 140 between the first ear pad 170 and the first housing 120, wherein the second earpiece 200 may include a second plate connected to an end of the headband 11, a second housing arranged on, directly or indirectly, a surface of the second plate, a second ear pad contacting the second housing and aligned in a second direction in which the second plate and the second housing are arranged, and a second pressure unit between the second ear pad and the second housing, wherein the first housing 120 may include a plurality of first housing grooves 130 along a circumference of the first housing, wherein the second housing may include a plurality of second housing grooves along a circumference of the second housing, wherein the first pressure unit 140 may include the first pressure plate 141 arranged to contact the first ear pad 170 along a circumference of the first ear pad 170, and a plurality of first pressure pins 143 of which the ends 1431 are unconstrainedly connected to the first pressure plate 141 and the other ends 1433 are unconstrainedly connected to the first housing grooves 130, respectively, wherein the second pressure unit may include a second pressure plate arranged to contact the second ear pad along a circumference of the second ear pad, and a plurality of second pressure pins of which the ends 1431 are unconstrainedly connected to the second pressure plate and the other ends 1433 are unconstrainedly connected, directly or indirectly, to the second housing grooves, respectively, wherein the first pressure pins 143 are unconstrainedly connected to the first pressure plate 141 as the ends 1431 of the first pressure pins 143 are accommodated in a plurality of first pressure plate grooves 142, respectively, provided along at least a portion of a circumference of the first pressure plate 141, the second pressure pins are unconstrainedly connected to the second pressure plate as the ends 1431 of the second pressure pins are accommodated in a plurality of second pressure plate grooves, respectively, provided along a circumference of the second pressure plate, at least a portion of each of the first housing grooves 130 may include the straight line part 131 provided in a direction perpendicular to a surface where the first pressure plate 141 contacts the first ear pad 170, at least a portion of each of the second housing grooves may include the straight line part 131 provided in a direction perpendicular to a surface where the second pressure plate contacts the second ear pad, a first repulsive body 144 may be accommodated in the straight line part 131 of the first housing grooves 130, and a second repulsive body may be accommodated in the straight line part 131 of the second housing grooves.

What is claimed is:

1. Headphones comprising:

a headband;

a first earpiece connected to an end portion of the headband; and a second earpiece connected to another end portion of the headband, wherein the first earpiece comprises:

a first plate connected to the end portion of the headband;

a first housing arranged on a surface of the first plate;

a first ear pad contacting the first housing and aligned in a first direction in which the first plate and the first housing are arranged; and a first pressure unit between the first ear pad and the first housing, wherein the first pressure unit comprises:

a first pressure plate; and a first pressure pin between at least the first pressure plate and the first housing, wherein at least a portion of the first pressure pin is unconstrainedly accommodated in an inside of the first pressure plate, wherein the first pressure plate is tiltable relative to the first housing.

2. The headphones of claim 1, wherein the first housing comprises a plurality of first housing grooves along a circumference of the first housing, in the first pressure pin, a portion connected to the first housing is unconstrainedly accommodated in the first housing grooves, and the first pressure pin is movable in a direction approaching the first pressure plate from the first housing and/or in a direction away from the first pressure pin.

3. The headphones of claim 2, wherein the first pressure plate has a ring shape and is arranged to contact the first ear pad along a circumference of the first ear pad, a plurality of first pressure pins are provided, an end of the first pressure pin is connected to the first pressure plate, and the other end of the first pressure pin is accommodated in the first housing grooves.

4. The headphones of claim 3, wherein at least some of the first housing grooves are symmetrically arranged with respect to a line extending from one end of the headband.

5. The headphones of claim 4, wherein the first pressure pins are unconstrainedly connected to the first pressure plate as each of the ends of the first pressure pins is accommodated in a plurality of first pressure plate grooves provided along a circumference of the first pressure plate.

6. The headphones of claim 5, wherein the end of the first pressure pin has a partially cut spherical shape, a spherical portion of the end of the first pressure pin is connected to a body of the first pressure pins, and a portion of each of the first pressure plate grooves has a spherical shape corresponding to the end of the first pressure pin.

7. The headphones of claim 6, wherein the spherical shape of the end of the first pressure pin is cut, in a surface direction perpendicular to a longitudinal direction of the first pressure pin, at a point distancing from the body the first pressure pin based on a center of the spherical shape of the first pressure pin.

8. The headphones of claim 3, wherein at least a portion of each of the first housing grooves comprises a straight line part provided in a direction perpendicular to a surface where the first pressure plate contacts the first ear pad.

9. The headphones of claim 8, wherein the other end of the first pressure pin has a partially cut spherical shape, the spherical shape of the first pressure pin is cut, in a surface direction perpendicular to a longitudinal direction of the first pressure pin, at a point distancing from the body the first pressure pin based on a center of the spherical shape of the first pressure pin, each of the first housing grooves comprises a ball part that is a groove in a cut spherical shape, and the ball part is connected to the straight line part of the first housing grooves and provided at a side facing the first pressure plate from the straight line part of the first housing grooves.

10. The headphones of claim 9, wherein the end of the first pressure pin is symmetrical to the other end of the first pressure pin based on the center of the first pressure pin.

11. The headphones of claim 1, wherein the first housing comprises first repulsive bodies respectively accommodated in straight line parts of grooves in the first housing and configured to accommodate at least a portion of the first pressure pin.

12. The headphones of claim 11, wherein at least one of the first repulsive bodies comprises an elastic body.

13. The headphones of claim 11, wherein at least one of the first repulsive bodies comprises an electromagnet, and a strength of the electromagnet of the first repulsive body is to be controlled by a controller provided inside of the first housing or separately provided.

14. The headphones of claim 6, wherein a radius of the spherical shape of the end of the first pressure pin is greater than a radius of a body portion between the end and the other end of the first pressure pin.

15. A wearable device comprising:

a band; and a contact piece connected to an end portion and an opposite end portion of the band, wherein the contact piece comprises:

a housing connected to the band;

a contact pad on a side of the housing; and a pressure unit between at least the housing and the contact pad, wherein the pressure unit comprises:

a pressure plate connected to the housing; and a pressure pin between at least the pressure plate and the housing, wherein at least a portion of the pressure pin is unconstrainedly accommodated in an inside of the pressure plate.

16. The wearable device of claim 15, wherein the housing comprises a plurality of housing grooves along a circumference of the housing, and in the pressure pin, a portion connected to the housing is unconstrainedly accommodated in the housing grooves.

17. The wearable device of claim 16, wherein a plurality of pressure pins are unconstrainedly connected to the pressure plate as the ends of the pressure pins are accommodated in a plurality of pressure plate grooves, respectively, provided along a circumference of the pressure plate, an end and the other end of the pressure pins have a partially cut spherical shape, and at least a portion of each of the housing grooves comprises a straight line part provided in a direction perpendicular to a surface where the pressure plate contacts the contact pad.

18. The wearable device of claim 17, wherein repulsive bodies comprising an elastic body and/or an electromagnet are accommodated in the straight line parts, respectively.

19. The wearable device of claim 18, wherein a radius of the spherical shape of the end of the pressure pin is greater than a radius of a body portion between the end and the other end of the pressure pin.

20. Headphones comprising:

a headband;

a first earpiece connected to an end of the headband; and a second earpiece connected to the other end of the headband, wherein the first earpiece comprises:

a first plate connected to an end of the headband;

a first housing arranged on a surface of the first plate;

a first ear pad contacting the first housing and aligned in a first direction in which the first plate and the first housing are arranged; and a first pressure unit between the first ear pad and the first housing, wherein the second earpiece comprises:

a second plate connected to an end of the headband;

a second housing arranged on a surface of the second plate;

a second ear pad contacting the second housing and aligned in a second direction in which the second plate and the second housing are arranged; and a second pressure unit between the second ear pad and the second housing, wherein the first housing comprises a plurality of first housing grooves along a circumference of the first housing, wherein the second housing comprises a plurality of second housing grooves along a circumference of the second housing, wherein the first pressure unit comprises:

a first pressure plate arranged to contact the first ear pad along a circumference of the first ear pad; and a plurality of first pressure pins of which ends are unconstrainedly connected to the first pressure plate and the other ends are unconstrainedly connected to the first housing grooves, respectively, wherein the second pressure unit comprises:

a second pressure plate arranged to contact the second ear pad along a circumference of the second ear pad; and a plurality of second pressure pins of which ends are unconstrainedly connected to the second pressure plate and the other ends are unconstrainedly connected to the second housing grooves, respectively, wherein the first pressure pins are unconstrainedly connected to the first pressure plate as the ends of the first pressure pins are accommodated in a plurality of first pressure plate grooves, respectively, provided along a circumference of the first pressure plate, the second pressure pins are unconstrainedly connected to the second pressure plate as the ends of the second pressure pins are accommodated in a plurality of second pressure plate grooves, respectively, provided along a circumference of the second pressure plate, at least a portion of each of the first housing grooves comprises a straight line part provided in a direction perpendicular to a surface where the first pressure plate contacts the first ear pad, at least a portion of each of the second housing grooves comprises a straight line part provided in a direction perpendicular to a surface where the second pressure plate contacts the second ear pad, a first repulsive body is accommodated in the straight line part of the first housing grooves, and a second repulsive body is accommodated in the straight line part of the second housing grooves.

* * * * *